US009998309B2

(12) United States Patent
Lopez et al.

(10) Patent No.: US 9,998,309 B2
(45) Date of Patent: Jun. 12, 2018

(54) TRANSMITTER, A RECEIVER, AND METHODS THEREIN

(71) Applicant: TELEFONAKTIEBOLAGET LM ERICSSON (PUBL), Stockholm (SE)

(72) Inventors: Miguel Lopez, Solna (SE); Dennis Hui, Sunnyvale, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days. days.

(21) Appl. No.: 15/312,393

(22) PCT Filed: May 20, 2014

(86) PCT No.: PCT/SE2014/050614
§ 371 (c)(1),
(2) Date: Nov. 18, 2016

(87) PCT Pub. No.: WO2015/178809
PCT Pub. Date: Nov. 26, 2015

(65) Prior Publication Data
US 2017/0099170 A1    Apr. 6, 2017

(51) Int. Cl.
*H04L 27/20*  (2006.01)
*H04B 7/06*  (2006.01)

(52) U.S. Cl.
CPC .......... *H04L 27/2003* (2013.01); *H04B 7/06* (2013.01)

(58) Field of Classification Search
CPC . H04B 1/00; H04B 1/69; H04B 1/707; H04B 7/04; H04B 7/06; H04B 7/08;
(Continued)

(56) References Cited

U.S. PATENT DOCUMENTS

| 2007/0030926 A1* | 2/2007 | Brown | H04L 27/233 375/340 |
| 2010/0309958 A1* | 12/2010 | Lakkis | H04J 13/0014 375/146 |
| 2015/0215064 A1* | 7/2015 | Quick, Jr. | H04J 11/0063 370/210 |

OTHER PUBLICATIONS

International Search Report and Written Opinion dated Feb. 4, 2015, in International Application No. PCT/SE2014/050614, 13 pages.
(Continued)

*Primary Examiner* — Shawkat M Ali
(74) *Attorney, Agent, or Firm* — Rothwell, Figg, Ernst & Manbeck, P.C.

(57) ABSTRACT

A transmitter and a method therein for transmitting CPM signals to a receiver. The transmitter divides bits into first and second bit sequences; obtains third and fourth bit sequences by appending bits to the first and second bit sequences. First and second intermediate sequences are generated based on the third and fourth bit sequences. The transmitter time-reverses the first and second intermediate sequences. The time-reversed first sequence is mapped to a third intermediate sequence, and the time-reversed second sequence is mapped to a fourth intermediate sequence. The transmitter generates fifth and sixth bit sequences from the third and fourth intermediate sequences. First and second CPM signals corresponding to first and second CPM bursts are created, which first burst is based on the third and sixth bit sequences, and which second burst is based on the fourth and fifth bit sequences. CPM signals are transmitted through a respective antenna.

13 Claims, 14 Drawing Sheets

Method in a transmitter 110

(58) Field of Classification Search
CPC ......... H04L 25/02; H04L 27/06; H04L 27/20; H04L 27/2003; H04L 27/26
USPC ................ 375/130, 146, 150, 239, 308, 340
See application file for complete search history.

(56) References Cited

OTHER PUBLICATIONS

Zangi K et al, "Physical-layer issues for deploying transmit diversity in GPRS/EGPRS networks", IEEE 54th Vehicular Technology Conference. VTC Fall 2001. Proceedings Oct. 7-11, 2001 Atlantic City, NJ, USA; [IEEE Vehicular Technolgy Conference], IEEE, IEEE 54th Vehicular Technology Conference. VTC Fall 2001. Proceedings (Cat. No. 01CH37211) IEEE P, (20011007), vol. 2, p. 538-542, XP010562485.

Qiang Li et al, "A space-time coding design for continuous phase modulation over the frequency selective fading channel", 2012 IEEE Wireless Communications and Networking Conference (WCNC), (20120401), doi:10.1109/WCNC.2012.6214202, p. 241-245, XP055163255.

Al-Dhahir N, "Single-carrier frequency-domain equalization for space-time block-coded transmissions over frequency-selective fading channels", IEEE Communications Letters, IEEE Service Center, Piscataway, NJ, US, (20010701), vol. 5, No. 7, doi:10.1109/4234.935750, ISSN 1089-7798, p. 304-306, XP011429862.

Liang Xian et al, "Simplified receiver design for STBC binary continuous phase modulation", IEEE Transactions on Wireless Communications, IEEE Service Center, Piscataway, NJ, US, (20080201), vol. 7, No. 2, doi:10.1109/TWC.2008.060628, ISSN 1536-1276, p. 452-457, XP011225058.

Umberto Mengali et al, "Decomposition of M-ARY CPM Signals into PAM Waveforms", IEEE Transactions on Information Theory, IEEE Press, USA, (19950901), vol. 41, No. 5, doi:10.1109/18.412675, ISSN 0018-9448, p. 1265-1275, XP000542618.

Lindskog E et al, "A Transmit Diversity Scheme for Channels With Intersymbol Interference", ICC 2000. 2000 IEEE International Conference on Communications. Conference Record. New Orleans, LA, Jun. 18-21, 2000; [IEEE International Conference on Communications], New York, NY : IEEE, US, (20000618), p. 307-311, XP001042960.

\* cited by examiner

Figure 1 Lindskog-Paulraj transmit diversity (prior art)

Fig. 3 Method in a transmitter 110

Fig. 5 Method in a receiver 120

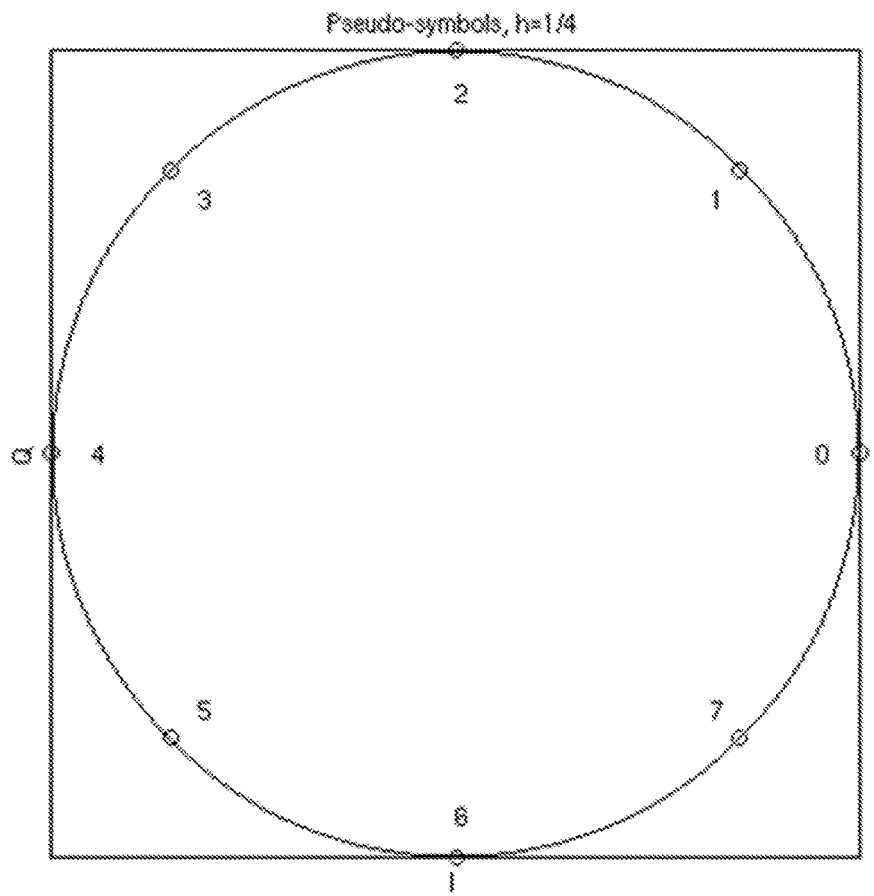
Figure 7 Example of pseudo-symbols $\wp_4$ for h=1/4

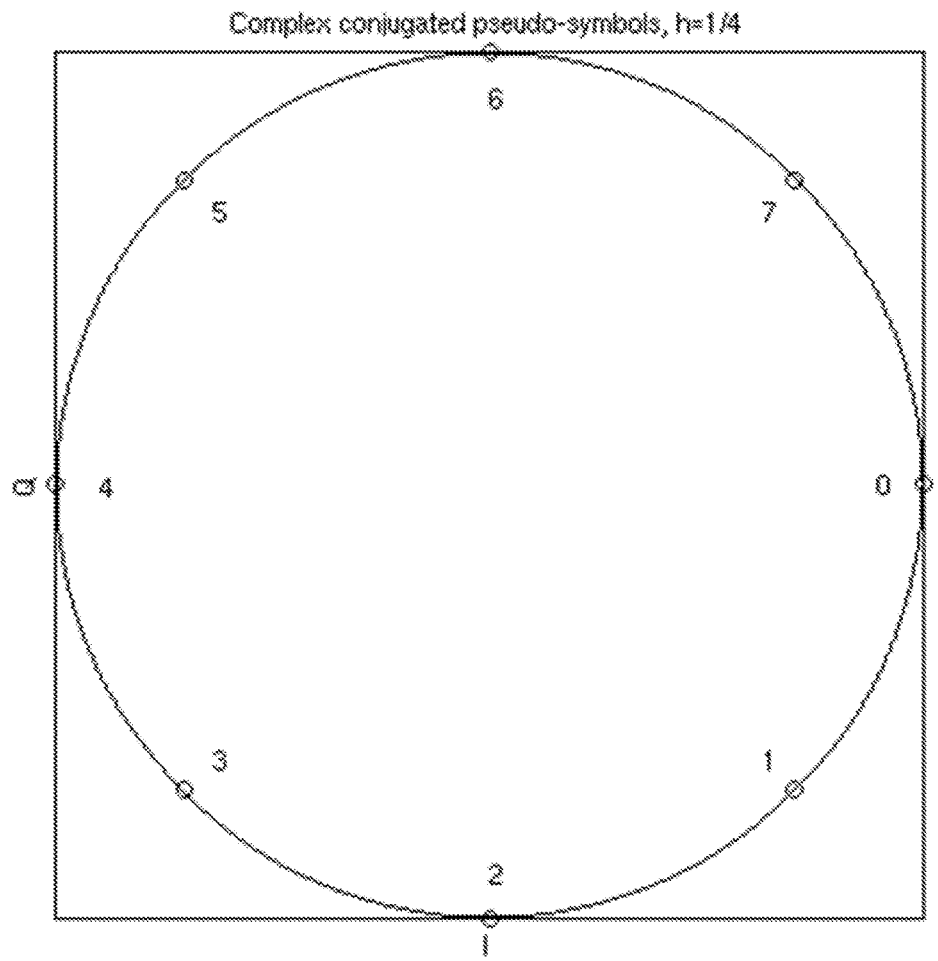
Figure 8 Permutation σ giving rise to the conjugated pseudo-symbols of Figure 7

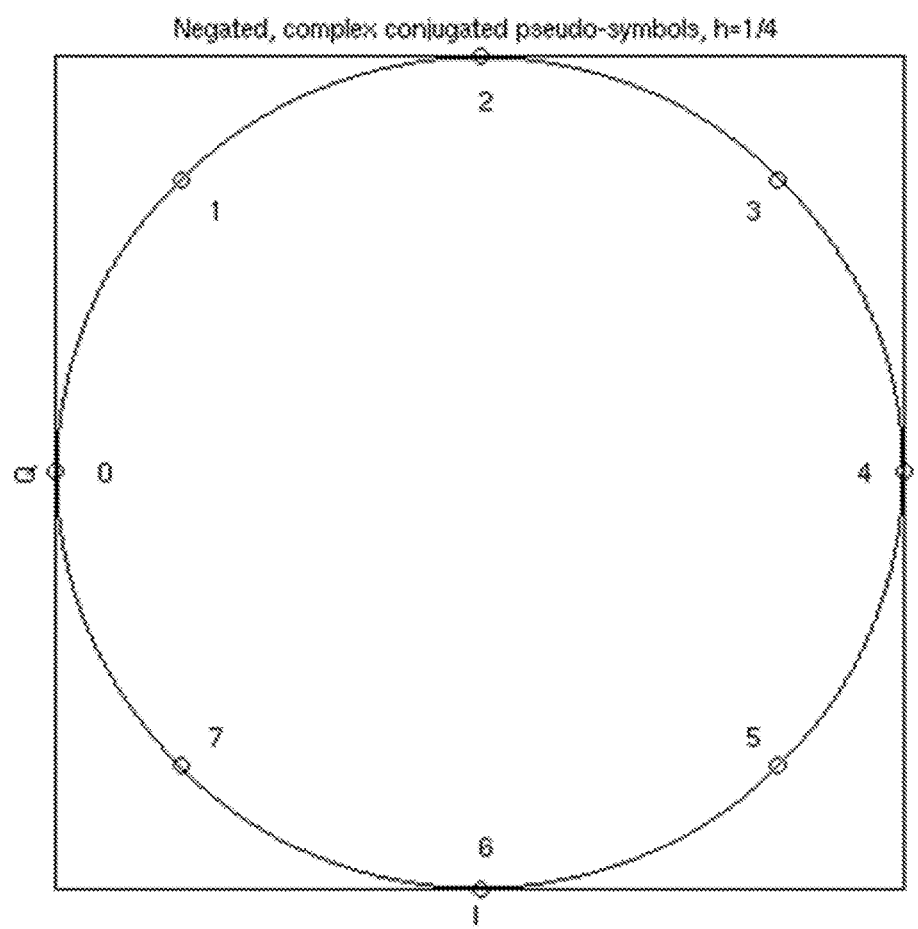
Figure 9 Permutation τ giving rise to the
negated and conjugated pseudo-symbols of Figure 7

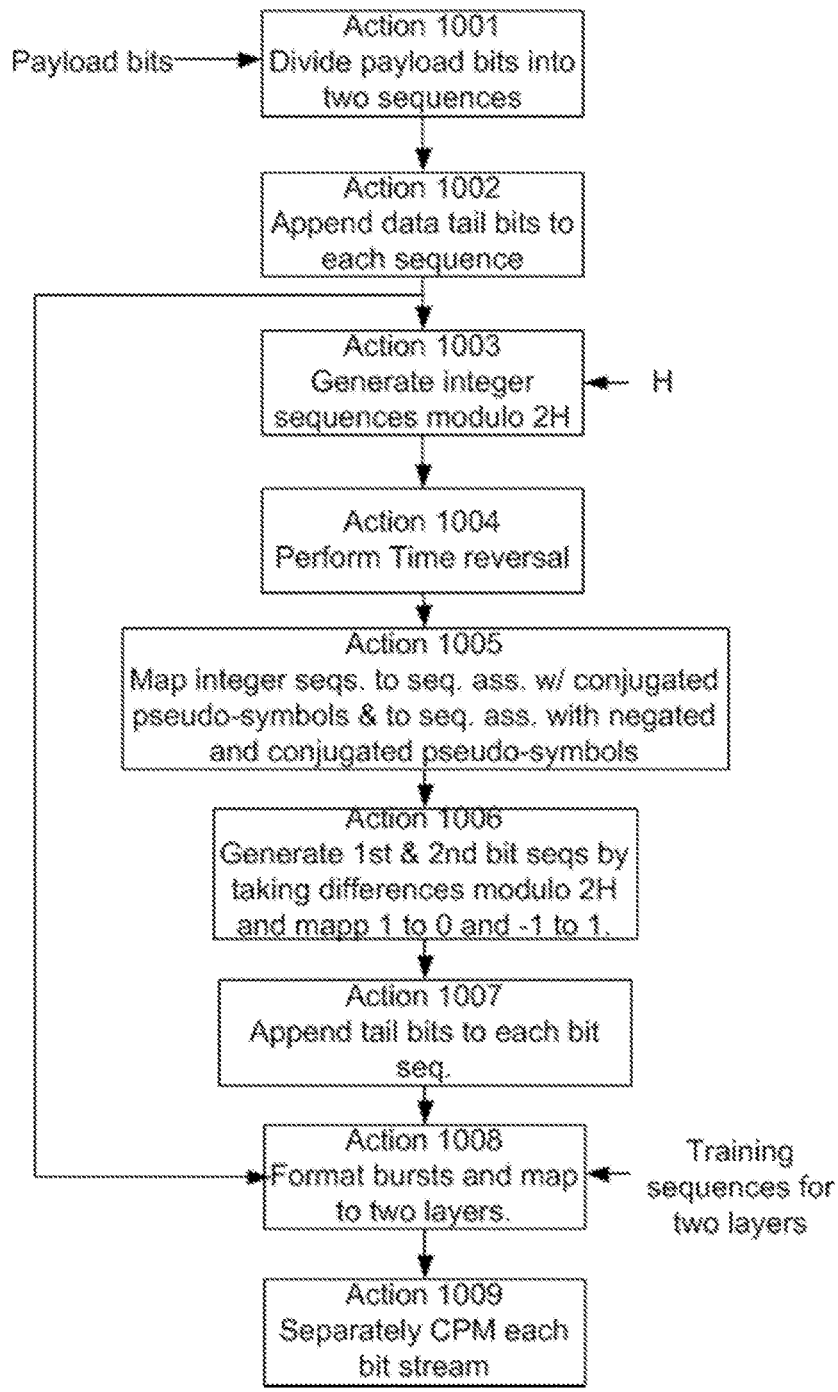
Figure 10 Transmitter processing, to be cont.

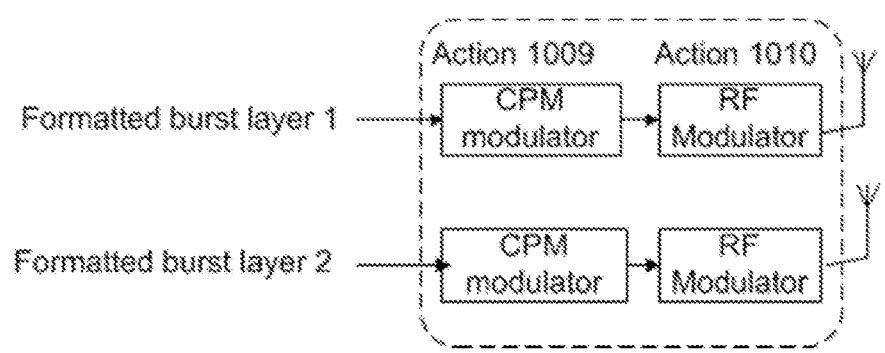
Figure 10 Transmitter processing, cont.

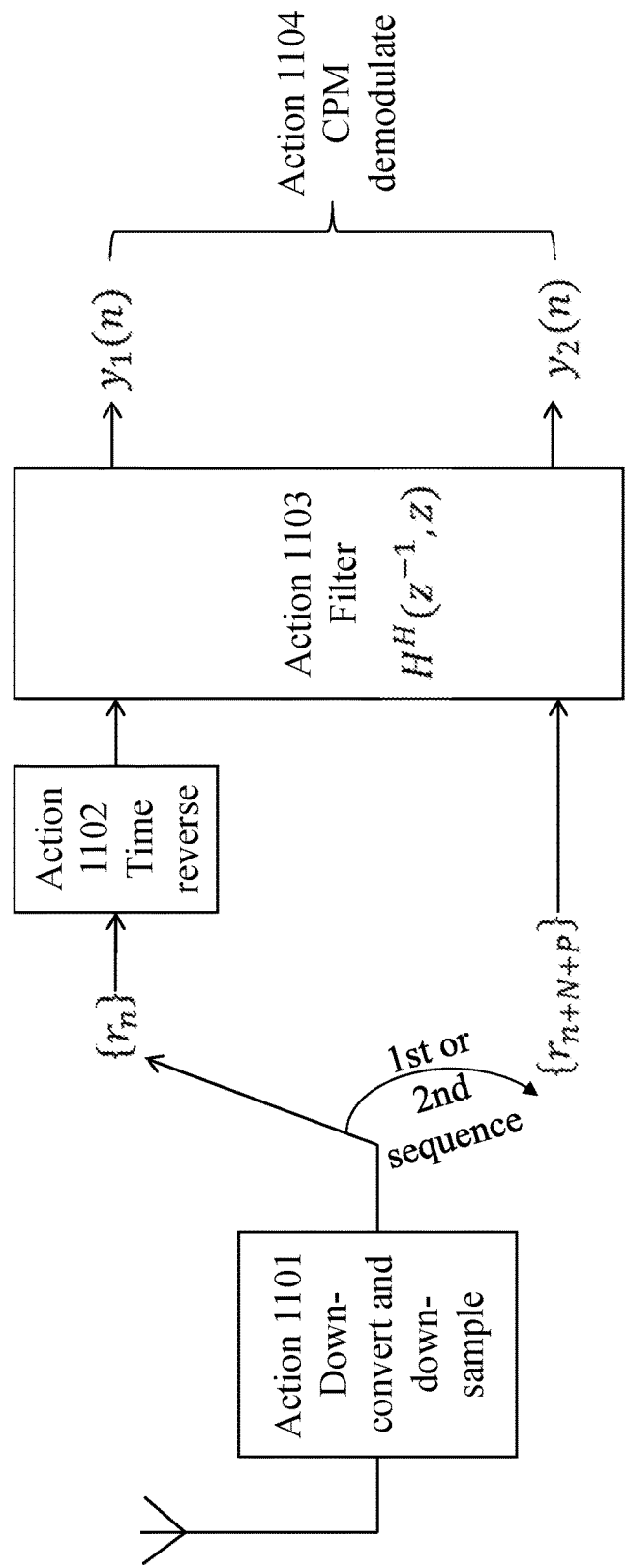
Figure 11 Receiver processing

Burst layer 1: $\{d1_k^{aug}\}, \{ts1_k\}, \{\varphi_m^{aug}\}$

Burst layer 2: $\{d2_k^{aug}\}, \{ts2_k\}, \{\theta_m^{aug}\}$

Figure 12A

Formatted burst layer 1: 0011101010101110010111011101000000100

Formatted burst layer 2: 0001000010001110010001000000000010101

Figure 12B

TRANSMITTER, A RECEIVER, AND METHODS THEREIN

CROSS REFERENCE TO RELATED APPLICATION(S)

This application is a 35 U.S.C. § 371 National Entry Application from PCT/SE2014/050614, filed May 20, 2014, designating the United States, the disclosure of which is incorporated herein in its entirety by reference.

TECHNICAL FIELD

Embodiments herein relate generally to a transmitter, a receiver and to methods therein. In particular they relate to the transmission and reception of one or more Continuous Phase Modulated (CPM) signals.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Continuous Phase Modulation (CPM) is a method for modulation of data commonly used in wireless communications systems. For example, CPM is used in wireless modems of the wireless communications systems. In contrast to other coherent digital phase modulation techniques wherein the carrier phase abruptly resets to zero at the start of every symbol, with CPM the carrier phase is modulated in a continuous manner. For instance, with a coherent digital phase modulation technique, such as Quadrature Phase-Shift Keying (QPSK), the carrier instantaneously jumps from a sine to a cosine, i.e. a 90 degree phase shift, whenever one of the two message bits of the current symbol differs from the two message bits of the previous symbol. This discontinuity requires a relatively large percentage of the power to occur outside of the intended band, e.g., high fractional out-of-band power, leading to poor spectral efficiency. Furthermore, CPM is typically implemented as a constant-envelope waveform, i.e. the transmitted carrier power is constant. CPM is advantageous because the phase continuity yields high spectral efficiency, and the constant envelope yields excellent power efficiency. However, a drawback is the high implementation complexity required for an optimal receiver.

CPM is a non-linear digital modulation method in which the phase of the signal is continuous. As mentioned above, it has excellent spectral characteristics. One of the most notable advantages of CPM is that it has constant envelope waveform, and therefore it is appropriate for use in transmitters using non-linear power amplifiers. For these reasons CPM is widely used in cellular communication systems and in satellite communication systems.

Transmit diversity is radio communication using signals that originate from two or more independent transmitters that have been modulated with identical information-bearing signals. Further, the signals may vary in their transmission characteristics at any given instant.

Transmit diversity may overcome the effects of fading, outages, and circuit failures. When using diversity transmission and reception, the amount of received signal improvement depends on the independence of the fading characteristics of the signal as well as circuit outages and failures.

In many communications systems, adding antennas to a receiver or a transmitter may be expensive or impractical. In such cases, transmit diversity using multiple transmit antennas may be used to provide diversity benefits at the receiver.

Since transmit diversity with N transmit antennas results in N sources of interference to other users, the interference environment will be different from conventional communication systems comprising one transmit antenna. Thus, even if transmit diversity has almost the same performance as receive diversity in noise-limited environments, the performance in interference-limited environments will differ.

Thus, transmit diversity techniques improve link performance without the need to add extra Radio Frequency (RF) equipment at the receiver, e.g. a mobile unit. A transmit diversity scheme specifically designed for channels with time dispersion was introduced in Lindskog and Paulraj, "A Transmit Diversity Scheme for delay Spread Channels", in Pro. IEEE Int. Conf. Commun. (ICC 2000), June 2000.

Below some properties of CPM and prior art on transmit diversity techniques will be described.

Decomposition of CPM Signals into Pulse Amplitude Modulation (PAM) Waveform

This section relates to a brief review of some background material that is needed in order to understand some embodiments which will be described herein. A detailed exposition of the material in this section is found in "Decomposition of M-ary CPM Signals into PAM Waveforms" (Mengali U., and Morelli, M., IEEE Transaction on Information Theory, vol. 41, no. 5, 1995).

Given a bit sequence $\vec{a} = \{a_k\}_{k=0}^N$, $a_k \in \{0,1\}$, a complex baseband CPM signal has the form $s(t) = \exp(j\psi(t, \vec{\alpha}))$ with $$\psi(t, \vec{\alpha}) = 2h\pi \sum_{n=0}^{N} \alpha_n q(t - nT),$$

where h is the modulation index, T is the signaling interval, $\alpha_k = 1 - 2a_k$, $\alpha_k \in \{-1, 1\}$ are the information symbols and q(t) is the phase pulse. The phase pulse is related to the frequency pulse f(t) by the relation $$q(t) = \int_{-\infty}^{t} f(s)ds.$$

The frequency pulse f(t) is time limited to the interval (0, LT), where L is a positive integer. When L=1, the CPM signal is called full response CPM. Otherwise it is called partial response CPM.

A CPM signal, s(t), may be decomposed into a superposition of PAM waveforms using the Laurent decomposition ("Decomposition of M-ary CPM Signals into PAM Waveforms" (Mengali U., and Morelli, M., IEEE Transaction on Information Theory, vol. 41, no. 5, 1995)), whenever the modulation index h is not an integer. This decomposition takes the following form.

$$s(t) = \sum_{k=0}^{Q-1} \sum_n b_{k,n} c_k(t - nT), \quad \text{(Equation 1)}$$

where $Q = 2^{L-1}$, $C_k(t)$ are a set of pulses whose explicit definition is found in Eq (7) of "Decomposition of M-ary CPM Signals into PAM Waveforms" (Mengali U., and Morelli, M., IEEE Transaction on Information Theory, vol. 41, no. 5, 1995), and $b_{n,k}$ are the so-called pseudo-symbols. The pseudo-symbols, $b_{n,k}$, depend on the information symbols, $\alpha_k \in \{-1, 1\}$, in a non-linear way. For a given $0 \le k \le 2^{L-1}$, the expansion of k in binary digits can be expressed as $$k = \sum_{i=1}^{L-1} 2^{i-1} \beta_{k,i}$$

for some binary coefficients $\beta_{k,i} \in \{0,1\}$. The pseudo-symbols are defined by $$b_{k,n} = \exp\left(j\pi h \left[\sum_{m \le n} \alpha_m - \sum_{i=0}^{L-1} \alpha_{n-i} \beta_{k,i}\right]\right). \quad \text{(Equation 2)}$$

The Laurent decomposition is not defined if h is an integer, see the paper "Decomposition of M-ary CPM Signals into PAM Waveforms" (Mengali U., and Morelli, M., IEEE Transaction on Information Theory, vol. 41, no. 5, 1995), Section II B.

Full response CPM (i.e. L=1) has a particularly simple Laurent decomposition, since $Q = 2^{L-1}$. In this case, Equation 1 and Equation 2 yield that the CPM signal, s(t), may be expressed as $$s(t) = \sum_{n=0}^{N} \exp\left(j\pi h \sum_{m \le n} \alpha_m\right) c_0(t - nT). \quad \text{(Equation 3)}$$

Even though the Laurent decomposition of a partial response CPM signal is more complex than its full response counterpart, the expression in Equation 3 is approximately valid for partial response CPM signals in many cases of practical interest. These cases include the Gaussian Minimum Shift Keying (GMSK) modulations used in Global System for Mobile Communications (GSM) and Digital Enhanced Cordless Telecommunication (DECT). In general, Equation 3 provides an accurate representation of a partial response CPM signal whenever the energy, that is, the second norm, in the pulses $C_k(t)$, $1 \le k \le 2^{L-1}$, is much less than the energy in the main pulse $C_0(t)$.

Lindskoq-Paulraj (LP) Transmit Diversity

In "A Transmit Diversity Scheme for delay Spread Channels" (Pro. IEEE Int. Conf. Commun. (ICC 2000), June 2000), Lindskog and Paulraj developed a transmit diversity scheme for channels with dispersion. The diversity scheme achieves full second-order receive diversity with one receive antenna and two transmit antennas. A symbol stream d(t) of complex-valued symbols to be transmitted is fed to a space-time encoder. The space-time encoder divides the symbol stream into two symbol streams; $d_1(t)$ and $d_2(t)$, each symbol stream containing half of the symbols. The transmission frame is also divided into two blocks. The space-time encoder provides input to two transmitters. The space-time encoder transmits, during a first block of the transmission, the time reversed, negated and complex conjugated second symbol stream $-d^*_2(N-t)$ from a first transmit antenna, and the time reversed, complex conjugated first symbol stream $d^*_1(N-t)$ through a second transmit antenna. The encoder transmits, during a second block of the transmission, the first symbol stream $d_1(t)$ from the first transmit antenna and the second symbol stream $d_2(t)$ from the second transmit antenna. FIG. 1 schematically illustrates the transmit diversity according to Lindskog-Paulray. Furthermore, the paper "A Transmit Diversity Scheme for delay Spread Channels" (Lindskog and Paulraj, in Pro. IEEE Int. Conf. Commun. (ICC 2000), June 2000) discloses the necessary receive processing.

SUMMARY

An object of embodiments herein is to provide a way of improving the performance in a wireless communications network.

According to a first aspect of embodiments herein, the object is achieved by a method in a transmitter for transmitting CPM signals to a receiver. The transmitter and the receiver are comprised in a wireless communications network.

The receiver divides a sequence of user code bits into a first bit sequence and a second bit sequence. The first and second bit sequences are of equal length.

Further, the transmitter obtains a third bit sequence by appending one or more tail bits to the first bit sequence, and a fourth bit sequence by appending one or more tail bits to the second bit sequence.

Furthermore, the transmitter generates a first intermediate sequence based on the third bit sequence, and a second intermediate sequence based on the fourth bit sequence. The first intermediate sequence corresponds to a first set of pseudo-symbols and the second intermediate sequence corresponds to a second set of pseudo-symbols.

Yet further, the transmitter time reverses the first intermediate sequence and the second intermediate sequence, maps the time-reversed first intermediate sequence to a third intermediate sequence corresponding to a conjugation of the first set of pseudo-symbols, and maps the time-reversed second intermediate sequence to a fourth intermediate sequence corresponding to a negation and conjugation of the second set of pseudo-symbols.

The transmitter also generates a fifth bit sequence from the third intermediate sequence and a sixth bit sequence from the fourth intermediate sequence.

The transmitter further creates a first CPM signal and a second CPM signal. The first CPM signal corresponds to a continuous phase modulated first burst, which first burst is based on the third bit sequence and the sixth bit sequence. The second CPM signal corresponds to a continuous phase modulated second burst, which second burst is based on the fourth bit sequence and the fifth bit sequence.

The transmitter transmits the first CPM signal through a first transmit antenna and the second CPM signal through a second transmit antenna.

According to a second aspect of embodiments herein, the object is achieved by a transmitter for transmitting CPM signals to a receiver. The transmitter and the receiver are comprised in a wireless communications network.

The transmitter comprises means adapted to divide a sequence of user code bits into a first bit sequence and a second bit sequence. The first and second bit sequences are of equal length.

The means is further adapted to obtain a third bit sequence by appending one or more tail bits to the first bit sequence, and a fourth bit sequence by appending one or more tail bits to the second bit sequence.

Further, the means is adapted to generate a first intermediate sequence based on the third bit sequence, and a second intermediate sequence based on the fourth bit sequence. The first intermediate sequence corresponds to a first set of pseudo-symbols and the second intermediate sequence corresponds to a second set of pseudo-symbols.

Furthermore, the means is adapted to time reverse the first intermediate sequence and time reverse the second intermediate sequence.

Yet further, the means is adapted to map the time-reversed first intermediate sequence to a third intermediate sequence corresponding to a conjugation of the first set of pseudo-symbols, and to map the time-reversed second intermediate sequence to a fourth intermediate sequence corresponding to a negation and conjugation of the second set of pseudo-symbols.

The means is furthermore adapted to generate a fifth bit sequence from the third intermediate sequence and a sixth bit sequence from the fourth intermediate sequence.

The means is also adapted to create a first CPM signal and a second CPM signal. The first CPM signal corresponds to a continuous phase modulated first burst, which first burst is based on the third bit sequence and the sixth bit sequence, and the second CPM signal corresponds to a continuous phase modulated second burst, which second burst is based on the fourth bit sequence and the fifth bit sequence.

The means is adapted to transmit the first CPM signal through a first transmit antenna and the second CPM signal through a second transmit antenna.

According to a third aspect of embodiments herein, the object is achieved by a method in a receiver for receiving a CPM signal from a transmitter. The receiver and the transmitter are comprised in a wireless communications network.

The receiver receives a CPM signal comprising a first received bit sequence in a first sample stream and a second received bit sequence in second sample stream.

Further, the receiver time reverses the second sample stream.

Furthermore, the receiver filters the respective first and second sample streams in order to decouple the respective first and second received bit sequences.

Yet further, the receiver continuous phase demodulates the respective first and second sample streams, whereby a sequence of user code bits comprised in the comprised in the received CPM signal is obtained.

According to a fourth aspect of embodiments herein, the object is achieved by a receiver for receiving a CPM signal from a transmitter. The receiver and the transmitter are comprised in a wireless communications network.

The receiver comprises means adapted to receive a CPM signal comprising a first received bit sequence in a first sample stream and a second received bit sequence in second sample stream.

Further, the means is adapted to time reverse the second sample stream.

Furthermore, the means is adapted to filter the respective first and second sample streams in order to decouple the respective first and second received bit sequences.

Yet further, the means is adapted to continuous phase demodulate the respective first and second sample streams, whereby a sequence of user code bits comprised in the received CPM signal is obtained.

According to a fifth aspect of embodiments herein, the object is achieved by a computer program, comprising instructions which, when executed on at least one processor, causes the at least one processor to carry out the method in the transmitter.

According to a sixth aspect of embodiments herein, the object is achieved by a computer program, comprising instructions which, when executed on at least one processor, causes the at least one processor to carry out the method in the receiver.

Since the user code bits are processed and formatted into a first and second burst as described above, and since a first CPM signal corresponding to the continuous phase modulated first burst is transmitted through the first transmit antenna and a second CPM signal corresponding to the continuous phase modulated second burst is transmitted through the second transmit antenna, the reception quality of signals at the receiver is enhanced. This results in an improved performance in the wireless communications network.

BRIEF DESCRIPTION OF DRAWINGS

Examples of embodiments herein are described in more detail with reference to attached drawings in which:

FIG. 7 schematically illustrates example pseudo-symbols for h=¼;

FIG. 8 schematically illustrates permutation σ giving rise to the conjugated pseudo-symbols of FIG. 7;

FIG. 9 schematically illustrates permutation τ giving rise to the negated and conjugated pseudo-symbols of FIG. 7;

FIG. 10 schematically illustrates embodiments of an exemplifying method in a transmitter; and FIG. 11 schematically illustrates embodiments of an exemplifying method in a receiver.

FIG. 12A shows burst layers according to one embodiment.

FIG. 12B shows formatted burst layers according to one embodiment.

DETAILED DESCRIPTION

Figure 1:
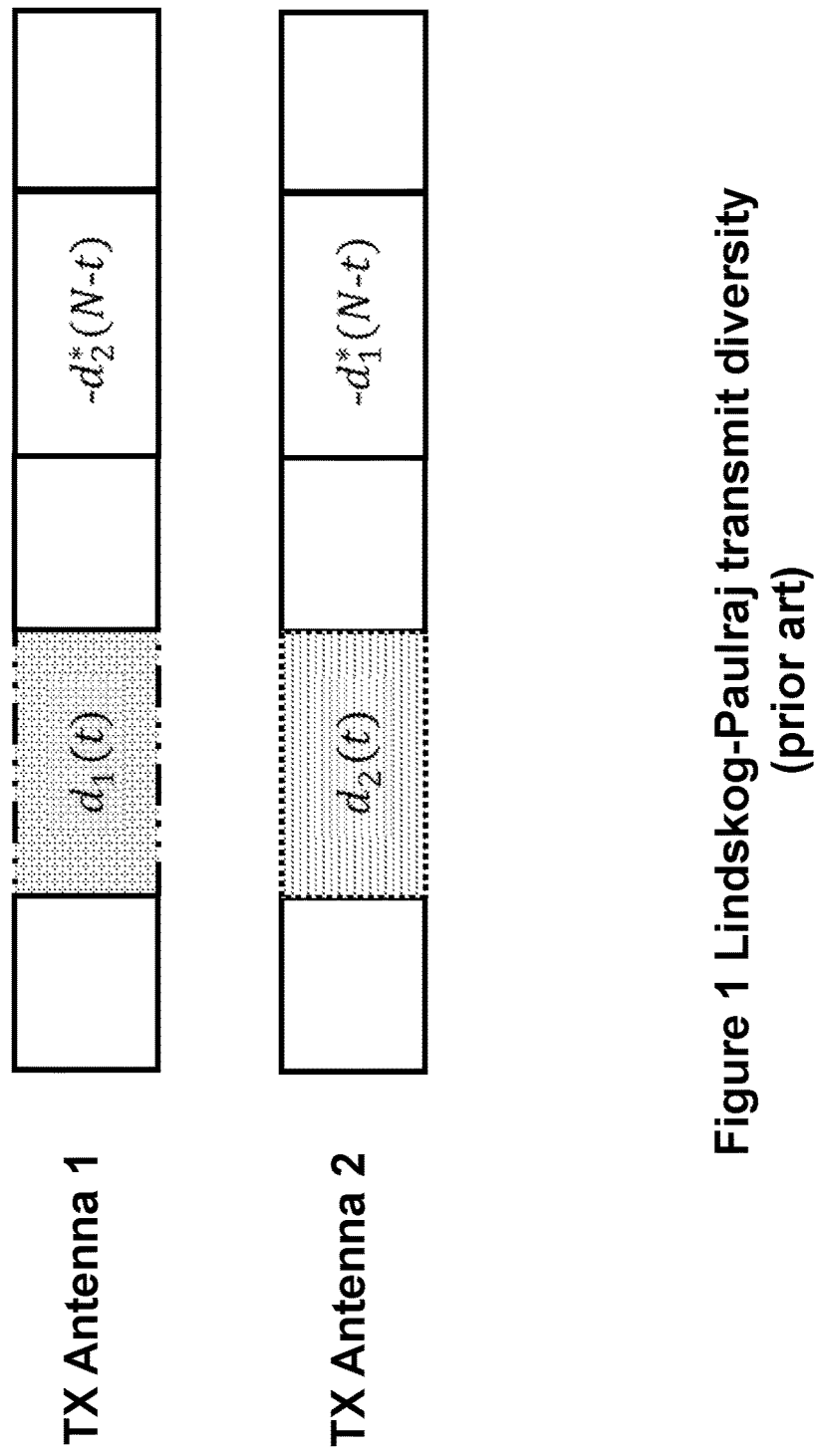
FIG. 1 schematically illustrates the Lindskog-Paulraj transmit diversity according to prior art.

As part of developing embodiments herein, some problems will first be identified and discussed. In order to improve the performance of a wireless communications network, it is desirable to apply transmit diversity techniques in time dispersive propagation environments. Especially, it is desirable to apply transmit diversity techniques in order to improve link performance between a transmitter, such as a base station, and a receiver, such as a terminal, without having to provide the receiver with any extra RF equipment. In addition, in many cases it is necessary or highly desirable to use Continuous Phase Modulation (CPM). However, the transmit diversity scheme disclosed in the prior art paper "A Transmit Diversity Scheme for Delay Spread Channels" (Lindskog and Paulraj, Proc. IEEE Int. Conf. Commun. (ICC 2000), June 2000) cannot be applied to non-linear CPM, since it was defined only for linear modulation schemes. Further, full rate space-time codes for non-linear CPM in channels with intersymbol interference are not previously known.

By the expression "full rate space-time codes" when used herein is meant that the code does not alter the symbol rate. In other words, symbols arrive at the transmitter at a given rate, e.g. a given number of symbols per second, and are output at the antenna at the same rate. This is in contrast to a repetition code wherein each symbol is repeated once, whereby the rate is reduced by 50 percent.

Some embodiments herein disclose a full rate transmit diversity scheme that provides full diversity gains for CPM signals. Full rate transmit diversity may be used with or without space-time codes. However, it is difficult to achieve both full rate at the transmitter and full diversity gains without the space-time code. Therefore, by the expression "full rate transmit diversity scheme" when used herein is meant full rate transmit diversity in combination with a novel space-time code. In other words, the "scheme" described in embodiments herein comprises a full rate space-time code.

Especially, some embodiments herein discloses a full rate transmit diversity scheme that provides full diversity gains for CPM signals in inter-symbol interference channels. Some embodiments herein apply to CPM with modulation index h of the form h=1/H, where H is an integer greater than one (1). The technique may be used to enhance the spectrum efficiency of the wireless communications system and thereby to improve the performance of the wireless communications network.

Some embodiments herein apply the Lindskog-Pulraj technique, which is defined for linear modulations, to non-linear CPM signals in order to improve the performance of the wireless communications network.

An advantage of embodiments herein is that they comprises a full rate transmit diversity scheme that provides full diversity gains for CPM signals. Especially, some embodiments herein discloses a full rate transmit diversity scheme that provides full diversity gains for CPM signals in inter-symbol interference channels. The technique may be used to enhance the spectrum efficiency of the wireless communications system and thereby to improve the performance of the wireless communications network.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
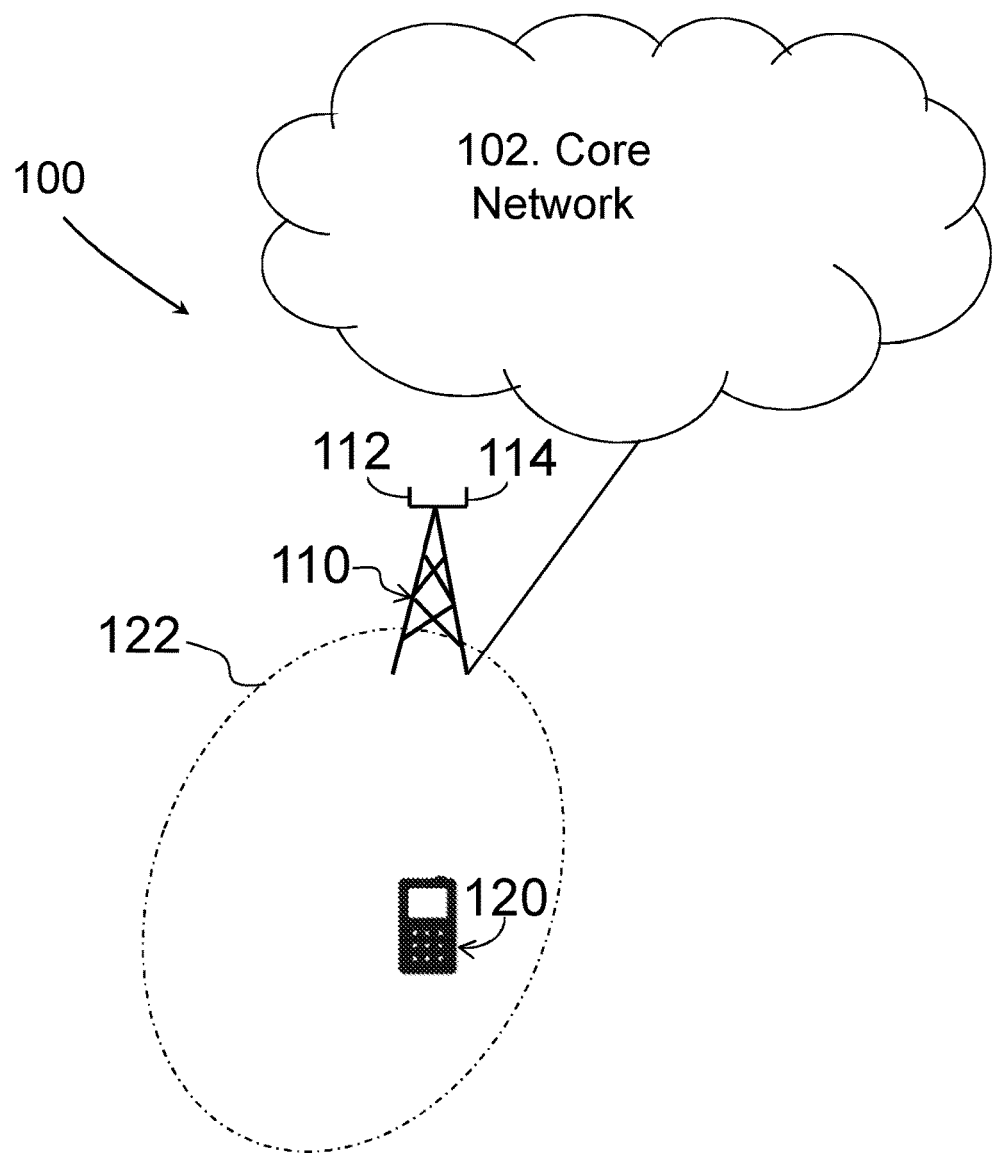
FIG. 2 schematically illustrates an embodiment of a wireless communications network.

As schematically illustrated in FIG. 2 embodiments herein relate to a wireless communication network 100. The wireless communications network 100 may be a wireless communication network such as an LTE, WCDMA, GSM network, any 3GPP cellular network, Wimax, or any cellular network or system.

The wireless communications network 100 comprises a transmitter 110 for transmitting continuous phase modulated signals to a receiver 120 located within a geographical area 122 served by the transmitter 110.

The transmitter 110 may be a transmission point such as a radio base station, for example an eNB, an eNodeB, or an Home Node B, an Home eNode B or any other network node capable to serve a user equipment or a machine type communication device in a wireless communications network. Further, the transmitter 110 may have a first transmit antenna 112 and a second transmit antenna 114. The transmitter 110 and the receiver 120 are comprised in a wireless communication network 100.

The receiver 120 such as a wireless device also referred to as a user equipment or UE is located in the wireless communication network 100. The receiver 120 may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

However, it should be understood that in some embodiments, the transmitter 110 is a wireless device such as a user equipment, and the receiver 120 is a radio base station or another network node capable of serving the user equipment.

Further, a core network 102 may be comprised in the wireless communication network 100 and connected to the transmitter 110.

It should be understood that the wireless communications network 100 may comprise a plurality of network nodes. However, only two network nodes, the transmitter 110 and the receiver 120, are depicted in FIG. 2.

Figure 3:
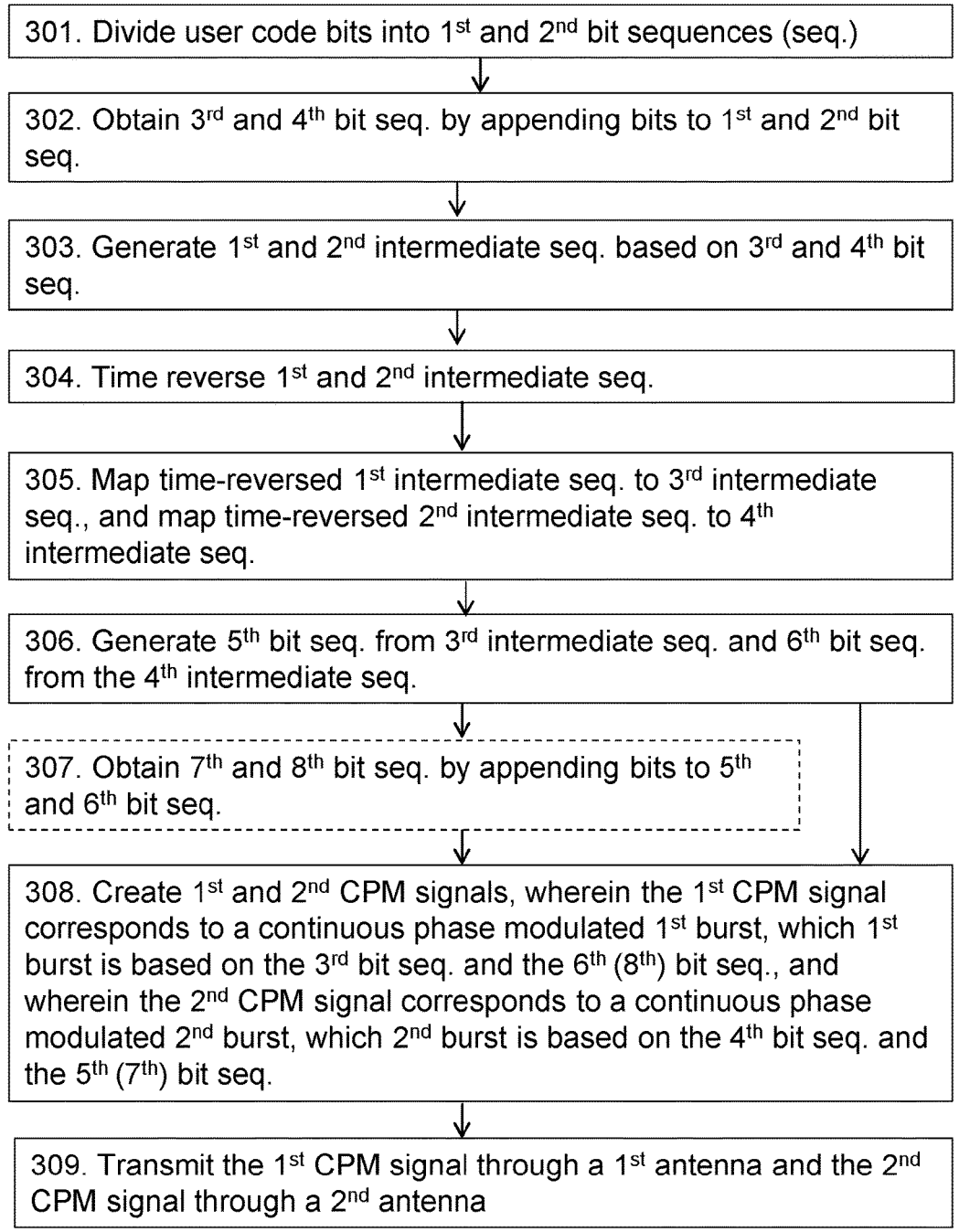
FIG. 3 is a flowchart depicting embodiments of a method in a transmitter.

A method in the transmitter 110 for transmitting CPM signals to the receiver 120 will now be described with reference to a flow chart depicted in FIG. 3. As mentioned above, the transmitter 110 and the receiver 120 are comprised in the wireless communications network 100. The method comprises one or more of the following actions. It should be understood that actions may be taken in another suitable order and that actions may be combined.

In order to pre-process user code bits to be transmitted from the transmitter 110 to the receiver 120, the transmitter 110 performs one or more of the Actions 301-307 to be described below.

Action 301

In order to pre-process user code bits to be transmitted to the receiver 120, the transmitter 110 divides a sequence of user code bits into a first bit sequence and a second bit sequence. The first and second bit sequences are of equal length.

Further, the user code bits may be payload or parts thereof, which payload or parts thereof is to be transmitted from the transmitter 110 to the receiver 120. Sometimes this may herein be referred to as grouping user code bits into two blocks.

Action 302

The transmitter 110 obtains a third bit sequence by appending one or more tail bits to the first bit sequence, and a fourth bit sequence by appending one or more tail bits to the second bit sequence. Sometimes this may herein be referred to as appending data dependent tail bits.

In some embodiments, the one or more tail bits are data dependent and chosen such that the pseudo-symbol sequences generated from the first, second, third and/or fourth intermediate sequences end in a predetermined pseudo-symbol given by $$\exp\left(j\frac{1\cdot\pi}{H}\right),$$

wherein H is a positive integer larger than 1.

Action 303

The transmitter 110 generates a first intermediate sequence based on the third bit sequence, and a second intermediate sequence based on the fourth bit sequence. The first intermediate sequence corresponds to a first set of pseudo-symbols and the second intermediate sequence corresponds to a second set of pseudo-symbols.

In some embodiments, the transmitter 110 generates the first intermediate sequence by applying, to the first bit sequence, a cumulative sum of binary symbols corresponding to the first bit sequence. Correspondingly, the transmitter 110 may generate the second intermediate sequence by applying, to the second bit sequence, a cumulative sum of binary symbols corresponding to the second bit sequence.

The respective first and second intermediate sequence may be an integer sequence $k_m$ comprising m integers. The integer sequence $k_m$ may be given by $$k_m = \left(\sum_{n\leq m} 1 - 2a_n\right) \mod 2H,$$

wherein $a_n$ are the user code bits comprised in the respective third and fourth bit sequence, mod is the modulus operation and H is a positive integer.

In some embodiments H is a reciprocal of the modulation index, h.

Sometimes this may herein be referred to as generating so-called pseudo-symbol sequences.

Action 304

The transmitter 110 time reverses the first intermediate sequence and time reverses the second intermediate sequence. By time reversing is herein meant that the order of the bits in the bit sequences is changed so that the first bit will be the last bit in the time reversed bit sequence, the second bit will be the next to last bit of the time reversed bit sequence, . . . , and so that the last bit will be the first bit of the time reversed bit sequence.

Sometimes this may herein be referred to as time reversing the pseudo-symbol sequences.

Action 305

The transmitter 110 maps the time-reversed first intermediate sequence to a third intermediate sequence corresponding to a conjugation of the first set of pseudo-symbols, and maps the time-reversed second intermediate sequence to a fourth intermediate sequence corresponding to a negation and conjugation of the second set of pseudo-symbols.

In some embodiments, the transmitter 110 maps, by means of a map σ(k), the time-reversed first intermediate sequence to the third intermediate sequence corresponding to the conjugation of the first set of pseudo-symbols. The map σ(k) may be given by σ(k)=(2H−k)mod 2H, wherein k is an integer between 0 and 2H−1, mod is the modulus operation and H is a positive integer. Further, the transmitter 110 may map, by means of a map τ(k), the time-reversed second intermediate sequence to the fourth intermediate sequence corresponding to the negation and conjugation of the second set of pseudo-symbols. The map τ(k) may be given by τ(k)=σ(k+H), and wherein k is an integer between 0 and 2H−1, and H is a positive integer.

Sometimes this may herein be referred to as conjugating and/or negating plus conjugating the pseudo-symbol sequences. In some embodiments, it may be referred to as conjugating the first set of pseudo-symbols and/or negating plus conjugating the second set of pseudo-symbols.

Action 306

The transmitter 110 generates a fifth bit sequence from the third intermediate sequence and a sixth bit sequence from the fourth intermediate sequence.

In some embodiments, the transmitter 110 generates the fifth bit sequence from the third intermediate sequence by taking differences modulo 2H of consecutive entries of the third intermediate sequence and mapping 1 to 0 and mapping a value equal to 2H−1 to 1. Further, the transmitter 110 may generate the sixth bit sequence from the fourth intermediate sequence by taking differences modulo 2H of consecutive entries of the fourth intermediate sequence and mapping 1 to 0 and mapping a value equal to 2H−1 to 1, wherein H is a positive integer.

Sometimes this may herein be referred to as obtaining bit sequences that generate the pseudo-sequences of Action 305.

Action 307

In some embodiments, the transmitter 110 obtains a seventh sequence and an eighth bit sequence by appending bits to the fifth bit sequence and the sixth bit sequence, respectively.

Action 308

The transmitter 110 creates a first CPM signal and a second CPM signal. The first CPM signal corresponds to a continuous phase modulated first burst, which first burst is based on the third bit sequence and the sixth bit sequence. Further, the second CPM signal corresponds to a continuous phase modulated second burst, which second burst is based on the fourth bit sequence and the fifth bit sequence.

In some embodiment, the first and second CPM signals are upmixed and/or amplified.

Action 309

The transmitter 110 transmits the first CPM signal through the first transmit antenna 112 and the second CPM signal through the second transmit antenna 114.

Figure 4:
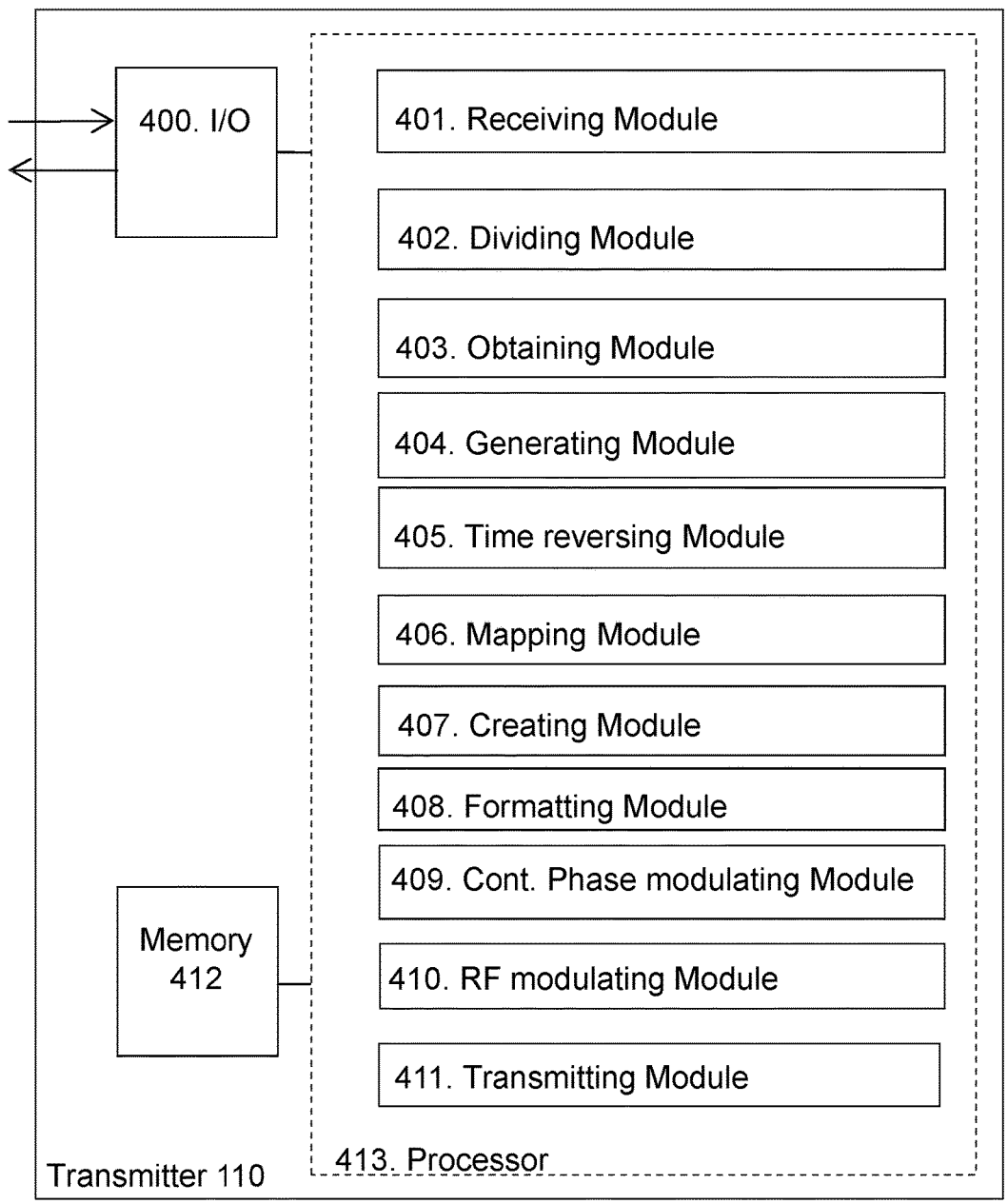
FIG. 4 is a schematic block diagram illustrating embodiments of a transmitter.

To perform the method for transmitting CPM signals to the receiver 120, the transmitter 110 may comprise an arrangement depicted in FIG. 4. As previously mentioned, the transmitter 110 and the receiver 120 are comprised in the wireless communications network 100.

In some embodiments, the transmitter 110 comprises an input and/or output interface 400 configured to communicate with one or more other communication devices, one or more other transmitters or one or more other receivers, such as the receiver 120.

The transmitter 110 may comprise a receiving module 401 configured to receive information such as e.g. user code bits from e.g. the one or more other transmitter 110 or the one or more other receiver 120. The receiving module 401 may be a wireless receiver of the transmitter 110.

The transmitter 110 comprises means, such as e.g. a dividing module 402, adapted to divide a sequence of user code bits into a first bit sequence and a second bit sequence. As previously mentioned, the first and second bit sequences are of equal length.

The dividing module 402 may be implemented as a processor 413 of the transmitter 110.

Further, the transmitter 110 comprises means, such as e.g. an obtaining module 403, adapted to obtain a third bit sequence by appending one or more tail bits to the first bit sequence, and a fourth bit sequence by appending one or more tail bits to the second bit sequence.

The one or more tail bits may be data dependent and chosen such that the pseudo-symbol sequences generated from the first, second, third and/or fourth intermediate sequences end in a predetermined pseudo-symbol given by $$\exp\left(j\frac{1\cdot\pi}{H}\right),$$

wherein H is a positive integer.

The obtaining module 403 may be implemented as the processor 413 of the transmitter 110.

Furthermore, the transmitter 110 comprises means, such as e.g. a generating module 404, adapted to generate a first intermediate sequence based on the third bit sequence, and a second intermediate sequence based on the fourth bit sequence. The first intermediate sequence corresponds to a first set of pseudo-symbols and the second intermediate sequence corresponds to a second set of pseudo-symbols.

The means adapted to generate the first intermediate sequence and the second intermediate sequence may further be adapted to generate the first intermediate sequence by applying, to the first bit sequence, a cumulative sum of binary symbols corresponding to the first bit sequence; and to generate the second intermediate sequence by applying, to the second bit sequence, a cumulative sum of binary symbols corresponding to the second bit sequence.

In some embodiments, the respective first and second intermediate sequence is an integer sequence $k_m$ comprising m integers. The integer sequence $k_m$ may be given by $$k_m = \left(\sum_{n \leq m} 1 - 2a_n\right) \mod 2H,$$

wherein $a_n$ are the user code bits comprised in the respective first and second bit sequence, mod is the modulus operation and wherein H is a positive integer.

The generating module 404 may be implemented as the processor 413 of the transmitter 110.

Yet further, the transmitter 110 comprises means, such as e.g. a time reversing module 405, adapted to time reverse the first intermediate sequence and the second intermediate sequence.

The time reversing module 405 may be implemented as the processor 413 of the transmitter 110.

The transmitter 110 also comprises means, such as e.g. a mapping module 406, adapted to map the time-reversed first intermediate sequence to a third intermediate sequence corresponding to a conjugation of the first set of pseudo-symbols, and to map the time-reversed second intermediate sequence to a fourth intermediate sequence corresponding to a negation and conjugation of the second set of pseudo-symbols.

In some embodiments, the means adapted to map further is configured to map, by means of a map σ(k), the time-reversed first intermediate sequence to the third intermediate sequence corresponding to the conjugation of the first set of pseudo-symbols. The map σ(k) may be given by σ(k)=(2H−k)mod 2H, wherein k is an integer between 0 and 2H−1, and H is a positive integer.

Further, the means adapted to map may be configured to map, by means of a map τ(k), the time-reversed second intermediate sequence to the fourth intermediate sequence corresponding to the negation and conjugation of the second set of pseudo-symbols. The map τ(k) may be given by τ(k)=σ(k+H), wherein k is an integer between 0 and 2H−1, and H is a positive integer.

The mapping module 406 may be implemented as the processor 413 of the transmitter 110.

Further, the transmitter 110 comprises means, such as e.g. the generating module 404, adapted to generate a fifth bit sequence from the third intermediate sequence and a sixth bit sequence from the fourth intermediate sequence.

In some embodiments, the means adapted to generate is configured to generate the fifth bit sequence from the third intermediate sequence by taking differences modulo 2H of consecutive entries of the third intermediate sequence and mapping 1 to 0 and mapping a value equal to 2H−1 to 1. Further, the means adapted to generate may further be adapted to generate the sixth bit sequence from the fourth intermediate sequence by taking differences modulo 2H of consecutive entries of the fourth intermediate sequence and mapping 1 to 0 and mapping a value equal to 2H−1 to 1, wherein H is a positive integer.

The transmitter 110 also comprises means, such as e.g. a creating module 407, adapted to create a first CPM signal and a second CPM signal. The first CPM signal corresponds to a continuous phase modulated first burst, which first burst is based on the third bit sequence and the sixth bit sequence. Further, the second CPM signal corresponds to a continuous phase modulated second burst, which second burst is based on the fourth bit sequence and the fifth bit sequence.

The creating module 407 may be implemented as the processor 413 of the transmitter 110.

The transmitter 110 may further comprise means, such as e.g. a formatting module 408, adapted to format one or more bit sequence into one or more burst. For example, the means may be adapted to format the third bit sequence and the sixth bit sequence in to the first burst and to format the fourth bit sequence and the fifth bit sequence into the second burst.

The formatting module 408 may be implemented as the processor 413 of the transmitter 110.

The transmitter 110 may further comprise means, such as e.g. a continuous phase modulating module 409, adapted to continuous phase modulate the one or more burst. For example, the means may be adapted to continuous phase modulate the first and second bursts.

The continuous phase modulating module 409 may be implemented as the processor 413 of the transmitter 110.

The transmitter 110 may further comprise means, such as e.g. a RF modulating module 410, adapted to radio frequency (RF) modulate the one or more continuous phase modulated burst. For example, the means may be adapted to RF modulate the continuous phase modulated first and second bursts.

The RF modulating module 410 may be implemented as the processor 413 of the transmitter 110.

In some embodiments, one or more of the means adapted to format one or more bit sequence into one or more burst, the means adapted to continuous phase modulate the one or more burst, and the means adapted to RF modulate one or more continuous phase modulated burst, are comprised in the means adapted to create first and second CPM signals.

Further, the transmitter 110 comprises means, such as e.g. a transmitting module 411, adapted to transmit the first CPM signal through the first transmit antenna 112 and the second CPM signal through the second transmit antenna 114.

The transmitting module 411 may be a wireless transmitter of the transmitter 110.

The transmitter 110 may also comprise means for storing data such as user code data. In some embodiments, the transmitter 110 comprises a memory 412 configured to store the data. The user code data may be processed or non-processed user code data or data and/or information relating thereto. The memory 412 may comprise one or more memory units. Further, the memory 412 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the transmitter 110.

Embodiments herein for transmitting CPM signals to the receiver 120 may be implemented through one or more processors, such as the processor 413 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the in the transmitter 110. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the transmitter 110.

Those skilled in the art will also appreciate that the receiving module, dividing module, obtaining module, generating module, time reversing module, mapping module, creating module, formatting module, continuous phase modulating module, RF modulating module and transmitting module described above may refer to a combination of analog and digital circuits, and/or one or more processors configured with software and/or firmware, e.g. stored in the memory, that when executed by the one or more processors such as the processors in the transmitter 110 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 5:
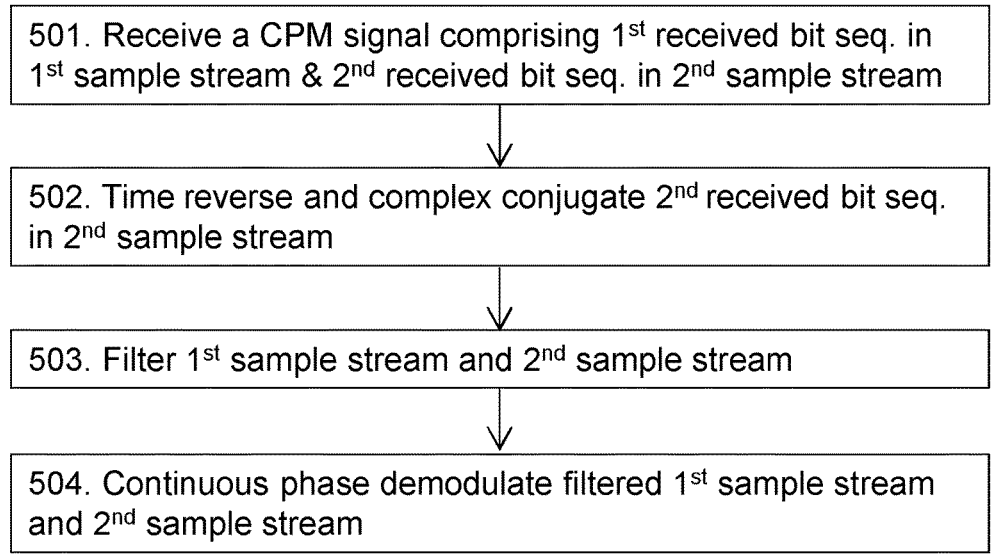
FIG. 5 is a flowchart depicting embodiments of a method in a receiver.

A method in the receiver 120 for receiving a CPM signal from the transmitter 110 will now be described with reference to a flow chart depicted in FIG. 5. As mentioned above, the transmitter 110 and the receiver 120 are comprised in the wireless communications network 100. The method comprises one or more of the following actions. It should be understood that actions may be taken in another suitable order and that actions may be combined.

Action 501

The receiver 120 receives a CPM signal comprising a first received bit sequence in a first sample stream and a second received bit sequence in second sample stream.

In some embodiments, the received signal is downconverted to baseband and digitized by the receiver 120.

The received CPM signal may comprise the first and second CPM signals transmitted from the transmitter 110. In some embodiments, the received CPM signal is a superposition of the first and second CPM signals.

Action 502

The receiver 120 time reverses and complex conjugates the second sample stream. Since the transmitter 110 time reversed the second half of the burst, which corresponds to the second sample stream, the receiver 120 time reverses the second sample stream in order to get the sample stream in the original order.

Action 503

The receiver 120 filters the respective first and second sample streams in order to decouple the respective first and second received bit sequences.

In some embodiments, the receiver 120 filters the respective first and second sample streams by means of a Multiple-Input Multiple-Output (MIMO) matched filter. This may also be expressed as the receiver 120 applies MIMO matched filtering to the first and second sample streams.

Action 504

The receiver 120 continuous phase demodulates the respective first and second sample streams, whereby a sequence of user code bits comprised in the received CPM signal is obtained.

Figure 6:
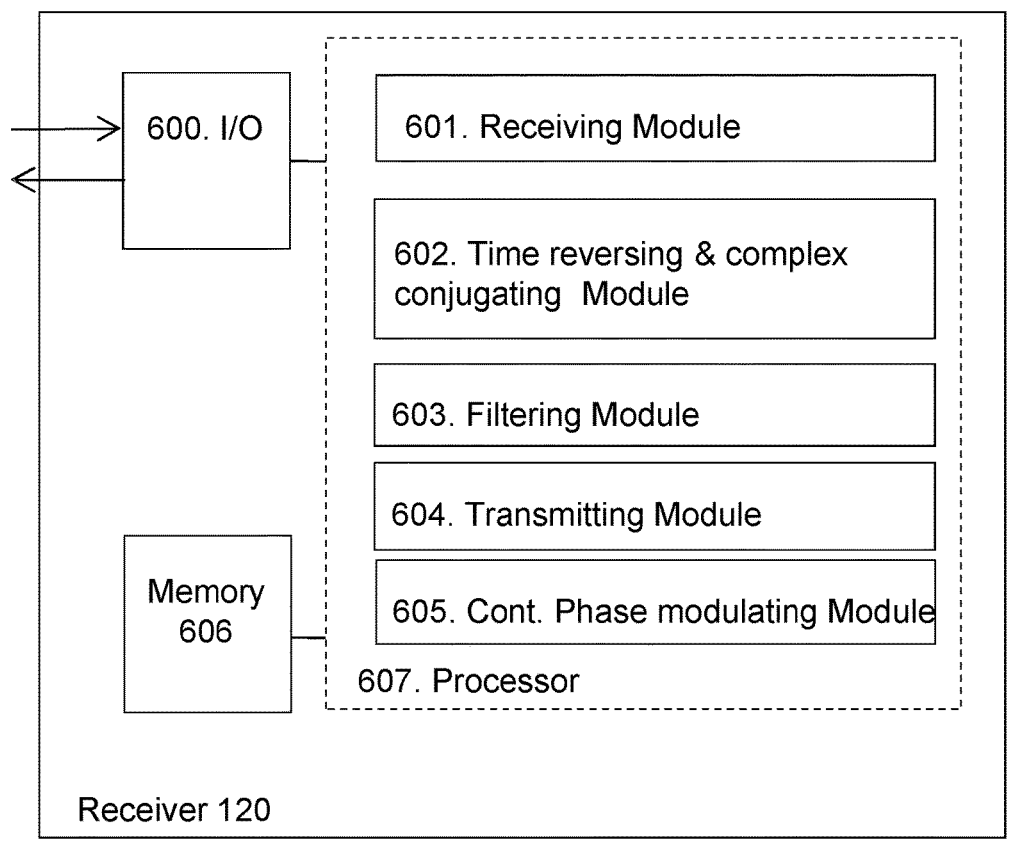
FIG. 6 is a schematic block diagram illustrating embodiments of a receiver.

To perform the method for receiving a CPM signal from the transmitter 110, the receiver 120 may comprise an arrangement depicted in FIG. 6. As previously mentioned, the transmitter 110 and the receiver 120 are comprised in the wireless communications network 100.

In some embodiments, the receiver 120 comprises an input and/or output interface 600 configured to communicate with one or more other communication devices, one or more other transmitters, such as the transmitter 110, or one or more other receivers.

The receiver 120 comprises means, such as e.g. a receiving module 601, adapted to receive a CPM signal. The CPM signal comprises a first received bit sequence in a first sample stream and a second received bit sequence in second sample stream.

As previously mentioned, the received CPM signal may comprise the first and second CPM signals transmitted from the transmitter 110. In some embodiments, the received CPM signal is a superposition of the first and second CPM signals.

The receiving module 601 may be a wireless receiver of the receiver 120.

The receiver 120 comprises further means, such as e.g. a time reversing and complex conjugating module 602, adapted to time reverse the second sample stream.

The time reversing and complex conjugating module 602 may be implemented as a processor 607 of the receiver 120.

Further, the receiver 120 comprises means, such as e.g. a filtering module 603, adapted to filter the respective first and second sample streams in order to decouple the respective first and second received bit sequences.

The filtering module 603 may be implemented as the processor 607 of the receiver 120. The filtering module 603 may be configured to filter the respective first and second sample streams by means of the matched MIMO filter.

Further, the receiver 120 may comprise means, such as e.g. a transmitting module 604, adapted to transmit e.g. a signal to one or more other receiver.

The transmitting module 604 may be a wireless transmitter of the receiver 120.

Furthermore, the receiver 120 comprises means, such as e.g. a continuous phase modulating module 605, adapted to continuous phase demodulate the respective first and second sample streams, whereby a sequence of user code bits comprised in the received CPM signal is obtained.

The continuous phase modulating module 605 may be implemented as the processor 607 of the receiver 120.

The receiver 120 may also comprise means for storing data such as user code data. In some embodiments, the receiver 120 comprises a memory 606 configured to store the data. The user code data may be processed or non-processed user code data or data and/or information relating thereto. The memory 606 may comprise one or more memory units. Further, the memory 606 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the receiver 120.

Embodiments herein for receiving CPM signals from the transmitter 110 may be implemented through one or more processors, such as the processor 607 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the in the receiver 120. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the receiver 120.

Those skilled in the art will also appreciate that the receiving module, derotating module, removing module, compensating module, time reversing module, filtering module, continuous phase demodulating module and transmitting module above may refer to a combination of analog and digital circuits, and/or one or more processors configured with software and/or firmware, e.g. stored in the memory, that when executed by the one or more processors such as the processors in the receiver 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Exemplifying embodiments of methods in the transmitter 110 and in the receiver 120 will be described below. Firstly, exemplifying embodiments of the method in the transmitter 110 will be described with reference to FIG. 10. Secondly, exemplifying embodiments of the method in a receiver 120 will be described with reference to FIG. 11.

Exemplifying Embodiments of the Method in a Transmitter 110

Modulation Index h=1/H, Wherein H is an Integer Greater than One (1)

Consider CPM with modulation index of the form h=1/H, wherein H>1 and wherein H is an integer. For full response CPM, or when the 0-th order Laurent decomposition of Equation 3 is a good approximation, the pseudo-symbols, given by Equation 2, may be expressed according to Equation 4:

$$b_{0,n} = \exp\left(j\frac{\pi}{H}\left[\sum_{m \leq n} \alpha_m\right]\right). \quad \text{(Equation 4)}$$

A key observation is that since H is a positive integer and $\alpha_k \in \{-1,1\}$, the pseudo-symbols may take on only 2H different values. Thus, the pseudo-symbols may be expressed as stated in Equation 5:

$$b_{0,n} \in \psi_n = \{1, e^{j\frac{\pi}{H}}, e^{j\frac{2\pi}{H}}, \ldots, e^{j\frac{(2H-1)\pi}{H}}\}. \quad \text{(Equation 5)}$$

Note that the set of possible pseudo-symbols has the following closure property. For any pseudo-symbol $b_{0,n} \in \wp_H$ both $b^*_{0,n} \in \wp_H$ and $-b^*_{0,n} \in \wp_H$. Here * means complex conjugation. In other words, for any pseudo-symbol it holds that both its complex conjugate and negated complex conjugate belong to the set of possible pseudo-symbols. The set of pseudo-symbols may be naturally identified with the set of integers modulo 2H, denoted $Z_{2H} = \{0, 1, \ldots, 2H-1\}$, by means of the mapping according to Equation 6:

$$k \rightarrow \exp\left(j\frac{\pi}{H}k\right). \quad \text{(Equation 6)}$$

In the example given below, and for the sake of concreteness, restriction is made to the particular case where H=4. This example comprises all the basic ingredients, and numerical examples will also be given.

FIG. 7 illustrates the pseudo-symbols in the case H=4, as well as the mapping according to Equation 6. This mapping may be used to associate to any sequence of pseudo-symbols a unique sequence of integers modulo 2H. For example, the sequence $$\{e^{j\frac{\pi}{H}}, e^{j\frac{4\pi}{H}}, e^{j\frac{(2H-1)\pi}{H}}, e^{j\frac{0\pi}{H}}\}$$

is associated to the sequence $\{1, 4, 2H-1, 0\}$.

The basic encoding strategy is the following. A sequence of payload bits generates a sequence of pseudo-symbols. This relates to Actions 301, 302, and 303 described above. These pseudo-symbols are time reversed and conjugated, or time reversed, conjugated and negated in order to produce two new sequences of pseudo-symbols. This relates to Actions 304, 305 and 306 described above. It will be shown that it is always possible to find a new sequence of bits that generate the time reversed, conjugated pseudo symbols, and another sequence of bits that generates the time reversed, conjugated and negated pseudo-symbols. Afterwards, the payload bits and the new sequences of bits are transformed into two formatted bursts by the addition of tail bits and/or training sequence bits. After continuous phase modulation the two CPM signals are equal or may be approximated by PAM signals of the form given by Equation 3 where the pseudo-symbols given by Equation 4 possess the same structure as the symbols in a linearly modulated Lindskog-Paulraj space-time code, as shown in FIG. 1. This relates to Actions 307 and 308 described above.

The details of the method are as follows. Recall that for the sake of concreteness we assume below that H=4.)

A sequence of user code bits $\{a_k\}_{k=0}^{N-1}$ gives rise to a sequence of integers modulo 8=2H, namely the sequence of integers $k_m$ given by Equation 7:

$$k_m = \left(\sum_{n \leq m} 1 - 2a_n\right) \mod 2H, \quad \text{(Equation 7)}$$

and to the corresponding pseudo-symbols $b_{0,m}$ given by Equation 8:

$$b_{0,m} = \exp\left(j\frac{\pi}{H}k_m\right). \quad \text{(Equation 8)}$$

Now, by definition, the sequence of integers $k_m$ given by Equation 7 has the property that either $k_m = k_{m-1}+1 \mod 8$ or $k_m = k_{m-1}-1 \mod 8$, depending on whether the bit $a_m$ is a 0 or a 1. Observe also that given a pseudo-symbol $$\exp\left(j\frac{\pi}{H}k_m\right),$$

its complex conjugate $$\exp\left(-j\frac{\pi}{H}k_m\right)$$

and its negated complex conjugate $$-\exp\left(-j\frac{\pi}{H}k_m\right)$$

may be expressed in the form given by Equations 9 and 10:

$$\exp\left(-j\frac{\pi}{H}k_m\right) = \exp\left(j\frac{\pi}{H}\sigma(k_m)\right), \quad \text{(Equation 9)}$$

$$-\exp\left(-j\frac{\pi}{H}k_m\right) = \exp\left(j\frac{\pi}{H}\tau(k_m)\right), \quad \text{(Equation 10)}$$

where σ and τ are permutations of $Z_8$. In general σ and τ are permutations of $Z_{2H}$. Indeed, it is readily verified that the following permutations given in Tables 1, 2, 3 and 4 below satisfy Equations 9 and 10.

TABLE 1

Permutation that gives the index of the conjugated pseudo-symbol, 2H − 1 = 7.

| σ | 0 | 1 | 2 | 3 | 4 | 5 | 6 | 7 |
|---|---|---|---|---|---|---|---|---|
|   | 0 | 7 | 6 | 5 | 4 | 3 | 2 | 1 |

TABLE 2

Permutation that gives the index of the negated and conjugated pseudo-symbol, 2H − 1 = 7.

| τ | 0 | 1 | 2 | 3 | 4 | 5 | 6 | 7 |
|---|---|---|---|---|---|---|---|---|
|   | 4 | 3 | 2 | 1 | 0 | 7 | 6 | 5 |

TABLE 3

Permutation that gives the index of the conjugated pseudo-symbol, arbitrary H > 1.

| σ | 0 | 1 | 2 | 3 | ... | 2H − 3 | 2H − 2 | 2H − 1 |
|---|---|---|---|---|-----|--------|--------|--------|
|   | 0 | 2H − 1 | 2H − 2 | 2H − 3 | ... | 3 | 2 | 1 |

TABLE 4

Permutation that gives the index of the negated and conjugated pseudo-symbol, arbitrary H > 1.

| τ | 0 | 1 | 2 | 3 | ... | H − 1 | H | H + 1 | H + 2 | ... | 2H − 3 | 2H − 2 | 2H − 1 |
|---|---|---|---|---|---|---|---|---|---|---|---|---|---|
|   | H | H − 1 | H − 2 | H − 3 | ... | 1 | 0 | 2H − 1 | 2H − 2 | ... | H + 3 | H + 2 | H + 1 |

The permutations defined above in the tables 3 and 4 are also given by the mathematical expressions σ(k)=(2H−k) mod 2H, and τ(k)=σ(k+H), wherein k is an integer between 0 and 2H−1.

For example, if H=4 and $k_m$=5 then $$-\left(\exp\left(j\frac{\pi}{4}5\right)^*\right) = -\exp\left(-j\frac{\pi}{4}5\right) = \exp\left(j\frac{\pi}{4}7\right) = \exp\left(j\frac{\pi}{4}\tau(5)\right).$$

The permutations σ and τ are illustrated in FIGS. 8 and 9, respectively.

Conjugation and time reversal of the pseudo-symbols $\{b_{0,k}\}_{k=0}^{N-1}$ give rise to the sequence of pseudo-symbols $\{b^*_{0,N-k-1}\}_{k=0}^{N-1}$. If $\{b_{0,k}\}_{k=0}^{N-1}$ is associated to the sequence $\{k_m\}_{k=0}^{N-1}$ through the mapping to Equation 6, then $\{b^*_{0,N-k-1}\}_{k=0}^{N-1}$ is associated to the sequence $\{\sigma(k_{N-m-1})\}_{k=0}^{N-1}$. In order to clean up the indices, define the time reversed integer sequence according to Equation 11:

$$k_m^{rev} \triangleq k_{N-m-1} \quad \text{(Equation 11)}$$

With the notation according to Equation 11 it can be seen that the time reversed pseudo-symbols $\{b^*_{0,N-k-1}\}_{k=0}^{N-1}$ are associated to the integer sequence $\{\sigma(k_m^{rev})\}_{m=0}^{N-1}$. Similarly, the time reversed, conjugated and negated sequence of pseudo-symbols $\{-b^*_{0,N-k-1}\}_{k=0}^{N-1}$ is associated to the sequence of integers $\{\tau(k_m^{rev})\}_{m=0}^{N-1}$. Now, the permutations σ and τ have the following property:

If k=n+1 mod 2H, then σ(k)=σ(n)−1 mod 2H, whereas if k=n−1 mod 2H then σ(k)=σ(n)+1 mod 2H. For example, 0=7+1 mod 8 implies that σ(0)=0=σ(7)−1=1−1=0 mod 8. Exactly the same property is valid for the permutations τ. Hence, provided σ($k_0^{rev}$)=±1 mod 2H, it is possible to find a sequence of bits $\{\theta_m\}_{m=0}^{N-1}$, $\theta_m \in \{0,1\}$, such that $$\sigma(k_m^{rev}) = \sum_{n \leq m}(1 - 2\theta_n) \mod 2H. \quad \text{(Equation 12)}$$

Indeed, assuming σ($k_0^{rev}$)=±1 mod 2H, just set $$\theta_0 = \frac{1 - \sigma(k_0^{rev})}{2}$$

and $$\theta_m = \frac{1 - \text{sign}(2 - [(\sigma(k_m^{rev}) - \sigma(k_{m-1}^{rev})) \mod 2H])}{2}, m > 0. \quad \text{(Equation 13)}$$

where sign (x)=$\begin{cases} 1 & \text{if } x>0 \\ -1 & \text{if } x \leq 0 \end{cases}$.

Similarly, there is a sequence of bits $\{\omega_m\}_{m=0}^{N-1}$, $\omega_m \in \{0,1\}$, such that $$\tau(k_m^{rev}) = \sum_{n \leq m}(1 - 2\omega_n) \mod 2H. \quad \text{(Equation 14)}$$

It is given by $$\omega_0 = \frac{1 - \tau(k_0^{rev})}{2}$$

(assuming τ($k_0^{rev}$)=±1 mod 2H) and $$\omega_m = \frac{1 - \text{sign}(2 - [(\tau(k_m^{rev}) - \tau(k_{m-1}^{rev})) \mod 2H])}{2}, m > 0. \quad \text{(Equation 15)}$$

EXAMPLES

Exemplifying Embodiments of the Method in a Transmitter 110

Exemplifying embodiments of the method in the transmitter 110 will now be described with reference to a flow chart depicted in FIG. 10. A sequence $\{a_k\}_{k=0}^{2N-1}$ of user code bits, e.g. the payload, is received from higher layers. This is the input to the transmitter 110, e.g. an encoder of the transmitter such as a space-time encoder, described in the following actions. Further, in the actions below a numerical example will also be given. In the example, the payload consists of twenty (20) user code bits: $\{a_k\}_{k=0}^{2N-1}$={00111010100001000010}, wherein N=10. Further, assume that the first layer is assigned a first training sequence $\{ts1_k\}$={110010} and the second layer is assigned a second training sequence $\{ts2_k\}$={100011}.

Action 1001

The transmitter 110 divides user code bits, e.g. the payload, into a first bit sequence and a second bit sequence. The first and second bit sequences may be of equal length. This relates to Action 301 previously described.

In the example, the user code bits of the payload is divided into two sequences, named d1 and d2, wherein $\{d1_k\}_{k=0}^{N-1}$={0011101010}, $\{d2_k\}_{k=0}^{N-1}$={0001000010}.

Action 1002

The transmitter 110 obtains a third and a fourth bit sequences by appending tail bits at the end of the first and second sequences of bits from Action 1001. This relates to Action 302 previously described. The tail bits may be data dependent and chosen in order to ensure that the pseudo-symbol sequences generated from these two sequences of bits end in a pre-determined pseudo-symbol. For example, the pre-determined pseudo-symbol may be $$\exp\left(j\frac{1 \cdot \pi}{H}\right).$$

In the example, the two sequences, d1 and d2, are augmented with three (3) data dependent tail bits on the right hand side in order to ensure that the pseudo-symbols generated by these bit sequences have a pre-determined last pseudo-symbol. In this example the first sequence is augmented by the tail bits {101}, and the second sequence is augmented by the tail bits {111}:
$\{d1_k^{aug}\}=\{0011101010101\}$, $\{d2_k^{aug}\}=\{0001000010111\}$.

Action 1003

The transmitter 110 generates a first and a second integer sequences associated with pseudo-symbols using Equation 7 (i.e. a cumulative sum of binary symbols corresponding to the bit sequences) applied to the third and fourth bit sequences of Action 1002. This relates to Action 303 previously described.

In the example, the sequences of integers in $Z_8$ associated with the pseudo-symbols is generated using the sequence of integers $k_m$ given by Equation 7:

$$k1_m = \left(\sum_{n\leq m} 1 - 2\cdot d1_n^{aug}\right) \bmod 8,$$ (Equation 7)

$$k2_m = \left(\sum_{n\leq m} 1 - 2\cdot d2_n^{aug}\right) \bmod 8.$$

Then, the following sequences are obtained:
$\{k1_m\}=\{1210707070707\}$, $\{k2_m\}=\{1232345656543\}$.

Action 1004

The transmitter 110 obtains a first and a second integer sequences by applying time reversal to the first and second integer sequences of Action 1003. This relates to Action 304 previously described.

In the example, the sequences $k1_m$, $k2_m$ are time reversed, i.e. the order of the bits in each sequence is reversed, which results in the two time-reversed sequences; $k1_m^{rev}$ and $k2_m^{rev}$: $\{k1_m^{rev}\}=\{7070707070121\}$, $\{k2_m^{rev}\}=\{3456565432321\}$.

Action 1005

The transmitter 110 maps the first of the time reversed integer sequences of Action 1004 to the integer sequence corresponding to the conjugated pseudo-symbols by means of the map $\sigma$. The map $\sigma$ is defined in Table 1 above for the particular case when H=4 and in Table 3 above for arbitrary H. Further, the transmitter 110 maps the second of the time reversed integer sequences of Action 1004 to the integer sequence corresponding to the negated, conjugated pseudo-symbols by means of the map $\tau$. The map $\tau$ is defined in Table 2 above for the particular case when H=4 and in Table 4 above for an arbitrary H. This relates to Action 305 previously described.

In the example, the map $\sigma$ from Table 1 is applied to each $k1_m^{rev}$ and the map $\tau$ from Table 2 is applied to each $k2_m^{rev}$ in order to obtain time reversed pseudo-symbols or negated, time reversed pseudo-symbols:
$\{\sigma(k1_m^{rev})\}=\{11010101010764\}$, $\{\tau(k2_m^{rev})\}=\{1076767012123\}$.

Action 1006

The transmitter 110 generates fifth and sixth bit sequences from the first and second integer sequences of Action 1005, by taking differences modulo 2H of the consecutive entries and then mapping 1 to 0 and 2H−1 to 1. The mathematical description is given by Equation 13 for the first sequence and by Equation 15 for the second sequence. This relates to Action 306 previously described.

In the example, two integer sequences generate two bit sequences $\theta_m$ and $\omega_m$ by applying Equation 13 to $\{\sigma(k1_m^{rev})\}$ and Equation 15 to $\{\tau(k2_m^{rev})\}$, which results in $\{\theta_m\}=\{01010101101110\}$, $\{\omega_m\}=\{0111010000100\}$.

Note that by construction $\sigma(k1_m^{rev})=\Sigma(1-2\theta_n) \bmod 8$, and $$\tau(k2_m^{rev}) = \sum_{n\leq m}(1-2\omega_n) \bmod 8.$$

For example, $$7 = \tau(k2_2^{rev}) = \sum_{n\leq 2}(1-2\omega_n) =$$

$$(1-2\cdot 0)+(1-2\cdot 1)+(1-2\cdot 1) = 1-1-1 = -1 = 7 \bmod 8.$$

Action 1007

In some embodiments, the transmitter 110 obtains seventh and eighth bit sequences by appending tail bits at the beginning of the fifth and sixth bit sequences from Action 1006. These tail bits may be data dependent. This relates to Action 307 previously described.

In the example, data dependent tail bits (in this example 0 0 1) are appended to the beginning of $\{\theta_m\}$ and data dependent tail bits (in this example 1 1 1) are appended at the beginning of $\{\omega_m\}$. Then the following bit sequences are obtained:
$\{\theta_m^{aug}\}=\{00101010101101110\}$, $\{\omega_m^{aug}\}=\{1110111010000100\}$.

Action 1008

The transmitter 110 formats first and second bursts and maps the first and second burst to first and second layers, respectively. The first burst may be formatted by optionally appending tail bits at the beginning of the third bit sequence of Action 1002, inserting a first training sequence as a midamble, followed by the sixth bit sequence of action 1007, which optionally may be followed by tail bits appended at the end. The second burst may be formatted by optionally appending tail bits at the beginning of the fourth bit sequence of Action 1002, inserting a second training sequence as a midamble, followed by the fifth bit sequence of Action 1007, which optionally may be followed by tail bits appended at the end. This relates to Action 308 previously described.

In the example, two bursts corresponding to the two layers are formatted by adding the training sequences as midambles, according to the format shown in FIG. 12A.

Using the sequences computed in Actions 1002 and 1007, the formatted burst layers showin in FIG. 12B are obtained.

The two blocks of bits within the dashed boxes are exactly the original payload bits called d1 and d2 in Action 1001.

Optionally, tail bits may be appended at the beginning and end of the bursts. However, such optional tail bits are omitted in this example.

Actions 1009 and 1010

The transmitter 110 separately continuous phase modulates the two bursts in the two layers. Further, the transmitter sends the continuous phase modulated bursts to RF modulators for transmission of the bursts through two transmit antennas. This relates to Actions 308 and 309 previously described.

In the example, the two bursts corresponding to the two layers are separately continuous phase modulated, and sent to RF modulators for transmission of the bursts through two transmit antennas. The pseudo-symbols associated to the formatted bursts in Action 1008 may be calculated using Equations 7 and 8. The integers associated with the pseudo-symbol sequences are shown in FIG. 13A.

Figures 13A, 13B:
FIG. 13A shows pseudo-symbols layers according to one embodiment.
FIG. 13B shows pseudo-symbols according to one embodiment.

It can be seen from Table 1 and Table 2, or alternatively from FIGS. 7, 8, and 9, that the pseudo-symbols within single waving lines in the first layer are obtained by time reversal and conjugation of the pseudo-symbols within double waving lines in the second layer, as shown in FIG. 13B. Similarly, the pseudo-symbols within the straight line box in the second layer are obtained by time reversal, negation, plus complex conjugation of the pseudo-symbols within the double-lined box in the first layer.

In other words, the transmitter 110, e.g. an encoder of the transmitter, described in Actions 1001-1008 above yields pseudo-symbols that have the same structure as the symbols in the Lindskog-Paulraj encoder shown in FIG. 1.

Exemplifying Embodiments of the Method in a Receiver 120

Exemplifying embodiments of the method in the receiver 120 will now be described with reference to a flow chart depicted in FIG. 11.

Assume that either full response CPM is used or that the zero-th order Laurent decomposition, e.g. Equation 3 of the transmitted signal provides a good approximation to the transmitted signal.

Denote a formatted burst for layers $\lambda=1, 2$ by $\{\beta_k^\lambda\}_{k=-M}^{2N+P+M-1}$. It is assumed that the payload consists of 2N bits $\{\alpha_k\}_{k=0}^{2N-1}$, while the rest are overhead, e.g. tail bits, training bits, possibly guard bits, etc. Moreover, $\beta_k^1 = \alpha_k$, $k=0,\ldots,N-1$, and $\beta_k^2 = \alpha_{N+k}$, $k=0,\ldots,N-1$.

The bursts in each layer are formatted as given by Equation 16:

$$\{\underbrace{\beta_{-M}^\lambda, \ldots, \beta_{-1}^\lambda}_{\text{overhead}}, \underbrace{\beta_0^\lambda, \ldots, \beta_{N-1}^\lambda}_{\text{payload}}, \underbrace{\beta_N^\lambda, \ldots, \beta_{N-1+P}^\lambda}_{\text{overhead}}, \underbrace{\beta_{N+P}^\lambda, \ldots, \beta_{2N+P-1}^\lambda}_{\text{space-time-code-bits}}, \underbrace{\beta_{2N+P}^\lambda, \ldots, \beta_{2N+P+M-1}^\lambda}_{\text{overhead}}\} \quad \text{(Equation 16)}$$

Define the binary symbols $\alpha_k^\lambda = 1 - 2\beta_k^\lambda$, $-M \le k \le 2N+P+M-1$, $\lambda = 1, 2$.

With this notation, and using the zero-th order Laurent decomposition, the transmitted signal from the respective antenna of the respective layer $\lambda=1,2$ has the form given by Equation 17:

$$s^\lambda(t) = \sum_{n=-M}^{2N+P+M-1} \exp\left(j\pi h \sum_{m \le n} \alpha_m^\lambda\right) c_0(t-nT) = \quad \text{(Equation 17)}$$

$$\sum_{n=-M}^{2N+P+M-1} b_{0,n}^\lambda c_0(t-nT).$$

In the last term on the right hand side of Equation 17, given by Equation 18:

$$b_{0,n}^\lambda = \exp\left(j\pi h \sum_{m \le n} \alpha_m^\lambda\right) \quad \text{(Equation 18)}$$

Denotes the pseudo-symbols, as defined in Equation 4. Next, assume that $p^\lambda(t)$ is the baseband equivalent of the convolution of the receiver filter with the time dispersive propagation radio channel from Tx antenna $\lambda=1,2$ to the receiver 120. Then, the continuous time received signal $r(t)$ may be expressed in the form given by Equation 19:

$$r(t) = \sum_{\lambda=1}^{2} \sum_n b_{0,n}^\lambda c_0 * p^\lambda(t-nT) + w(t), \quad \text{(Equation 19)}$$

where $w(t)$ models noise and interference. Defining $h^\lambda = c_0 * p^\lambda$ and sampling at the instants $t=kT$ we arrive at $$r(kT) = \sum_{\lambda=1}^{2} \sum_n b_{0,n}^\lambda h^\lambda((k-n)T) + w(kT). \quad \text{(Equation 20)}$$

Set $r_k \triangleq r(kT)$, $h_k^\lambda \triangleq h^\lambda(kT)$, $w_k \triangleq w(kT)$ and find an integer K such that $h_k=0$ if $k \ge K$. Then, by re-arranging the sums, Equation 20 may be re-written as $$r_n = \sum_{\lambda=1}^{2} \sum_{k=0}^{K-1} b_{0,n}^\lambda h_k^\lambda + w_n. \quad \text{(Equation 21)}$$

Using the signal model of Equation 21 and the Z transform notation, it is seen that the signal received at the receiver 120 during the second half burst, corresponding to parts of the payload, is given by $$r_{N+P+n} = h^1(z^{-1}) b_{0,N+P+n}^1 + h^2(z^{-1}) b_{0,N+P+n}^2 + w_{N+P+n}, \quad 0 \le n \le N-1. \quad \text{(Equation 22)}$$

In Equation 22, the Z transform acts on the index n. For example $$z^{-k} b_{0,N+P+n}^1 = b_{0,N+P+n-k}^1.$$

Similarly, the signal received at the receiver 120 during the first half burst, corresponding to parts of the payload, is given by $$r_n = h^1(z^{-1}) b_{0,n}^1 + h^2(z^{-1}) b_{0,n}^2 + w_n, \quad 0 \le n \le N-1. \quad \text{(Equation 23)}$$

Next, recall that the transmitter 110, e.g. an encoder of the transmitter, ensured that the pseudo-symbols $\{b_{0,n}^1\}_{n=0}^{N-1}$ are obtained by time reversal, negation and complex conjugation of the pseudo-symbols $\{b_{0,N+P+n}^2\}_{n=0}^{N-1}$. The transmitter 110, e.g. the encoder, also ensures that the pseudo-symbols $\{b_{0,n}^2\}_{n=0}^{N-1}$ are obtained by time reversal and complex conjugation of the pseudo-symbols $\{b_{0,N+P+n}^1\}_{n=0}^{N-1}$. Hence, Equation 23 may be re-written as follows:

$$r_{N+P+n} = h^1(z^{-1})((b_{0,N-1-n}^2)^*) + h^2(z^{-1})((b_{0,N-1-n}^1)^*) + w_n, \quad 0 \le n \le N-1. \quad \text{(Equation 24)}$$

Applying complex conjugation and time reversal to both sides in Equation 24 we obtain $$r^*_{2N+P-1-n} = -h^{1*}(z)(b_{0,n}^2) + h^{2*}(z)(b_{0,n}^1) + w^*_{2N+P-1-n}, \quad 0 \le n \le N-1. \quad \text{(Equation 25)}$$

Equations 22 and 25 may be written jointly in matrix form:

$$\begin{bmatrix} r^*_{2N+P-1-n} \\ r_n \end{bmatrix} = \underbrace{\begin{bmatrix} h^{2*}(z) & -h^{1*}(z) \\ h^1(z^{-1}) & h^2(z^{-1}) \end{bmatrix}}_{H(z,z^{-1})} \begin{bmatrix} b_{0,n}^1 \\ b_{0,n}^2 \end{bmatrix} + \begin{bmatrix} w^*_{2N+P-1-n} \\ w_n \end{bmatrix}. \quad \text{(Equation 26)}$$

Just as in the Lindskog-Paulraj methodology, the matrix $H(z,z^{-1})$ is orthogonal, so $$\begin{bmatrix} y_1(n) \\ y_2(n) \end{bmatrix} \triangleq H^H(z^{-1}, z) \begin{bmatrix} r^*_{2N+P-1-n} \\ r_n \end{bmatrix}$$

$$= (h^{1*}(z)h^1(z^{-1}) + h^{2*}(z)h^2(z^{-1})) \begin{bmatrix} b^1_{0,n} \\ b^2_{0,n} \end{bmatrix} +$$

$$H^H(z^{-1}, z) \begin{bmatrix} w^*_{2N+P-1-n} \\ w_n \end{bmatrix},$$

(Equation 27)

where the superscript $^H$ denotes the transpose and complex conjugation of the coefficients in $H(z,z^{-1})$ but not the variables z and $z^{-1}$. Equation 27 shows that the two half bursts have been decoupled and that full diversity gain is obtained (Lindskog and Paulraj, "A Transmit Diversity Scheme for delay Spread Channels", in Pro. IEEE Int. Conf. Commun. (ICC 2000), June 2000). Decoupling means that the first stream after filtering $y_1$ depends only on the first half of the user code bits $(\alpha_n)_{n=0}^{N-1}$, while the second stream after filtering $y_1$ depends only on the second half of the user code bits $(\alpha_n)_{n=N}^{2N-1}$.

Further, the filtering operation applied in Equation 18 comprises the application of a matched Multiple-Input Multiple-Output (MIMO) filter $H^H(z^{-1},z)$ to the first sample stream and to the time reversed and complex conjugated second sample stream.

Defining a noise term $$\begin{bmatrix} e^1_n \\ e^2_n \end{bmatrix} = H^H(z^{-1}, z) \begin{bmatrix} w^*_{2N+P-1-n} \\ w_n \end{bmatrix}$$

(Equation 28)

and a scalar channel $$g(z,z^{-1}) = (h^{1*}(z)h^1(z^{-1}) + h^{2*}(z)h^2(z^{-1}))$$

(Equation 29)

the pre-processed received signal is equivalent to two de-coupled scalar baseband models:

$$y_\lambda(n) = g(z,z^{-1}) b_{0,n}^\lambda + e_n^\lambda, \quad \lambda=1,2, n=0, \ldots, N-1.$$

(Equation 30)

Note that the pseudo-symbols $b_{0,n}^\lambda$, $\lambda=1, 2, n=0, \ldots, N-1$ depend only upon the payload bits $\{a_k\}_{k=0}^{2N-1}$ and possibly known tail/guard bits. Indeed, by definition $$b^1_{0,n} = \exp\left( j\pi h \left[ \underbrace{\sum_{m<0} \alpha^1_m}_{tail} + \underbrace{\sum_{0 \le m \le n} (1 - 2a_m)}_{payload} \right] \right)$$

(Equation 31)

$$b^2_{0,n} = \exp\left( j\pi h \left[ \underbrace{\sum_{m<0} \alpha^2_m}_{tail} + \underbrace{\sum_{0 \le m \le n} (1 - 2a_{N+m})}_{payload} \right] \right)$$

(Equation 32)

Therefore, the payload bits $\{a_k\}_{k=0}^{2N-1}$ may be demodulated from Equation 30 by means of a CPM demodulator.

Under the assumption that the received digital baseband signal has been sampled at the symbol rate exemplifying embodiments of a method in the receiver 120 depicted in FIG. 11 may be described by the following actions. It should be understood that actions may be taken in another suitable order and/or may be combined.

Action 1101

The receiver 120 receives a first sample stream in a first block of a burst, and receiving a second sample stream in a second block of the burst. This relates to Action 501 described above.

In some embodiments, the received burst is down-converted and down-sampled.

Action 1102

The receiver 120 time reverses and complex conjugates the second sample stream in the second block. This relates to Action 502 described above.

Action 1103

The receiver 120 filters the first and second blocks in order to decouple the two transmitted payload half bursts. As previously mentioned, the receiver 120 may filter the first and second blocks by means of the matched MIMO filter. This may also be expressed as the receiver 120 applies MIMO matched filtering to the first and second blocks. This relates to Action 503 described above.

Action 1103

The receiver 120 forwards the filtered first and second blocks to a CPM demodulator for continuous phase demodulation of the first and second block. This relates to Action 502 described above and the CPM demodulator may be released by the means adapted to perform continuous phase demodulation, such as the continuous phase demodulating module 605 shown in FIG. 6.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a transmitter for transmitting continuous phase modulated (CPM) signals to a receiver, wherein the transmitter and the receiver are comprised in a wireless communications network, and wherein the method comprises:

dividing a sequence of user code bits into a first bit sequence and a second bit sequence, wherein the first and second bit sequences are of equal length;

obtaining a third bit sequence by appending one or more tail bits to the first bit sequence, and a fourth bit sequence by appending one or more tail bits to the second bit sequence;

generating a first intermediate sequence based on the third bit sequence, and a second intermediate sequence based on the fourth bit sequence, wherein the first intermediate sequence corresponds to a first set of pseudo-symbols and wherein the second intermediate sequence corresponds to a second set of pseudo-symbols;

time reversing the first intermediate sequence and the second intermediate sequence;

mapping the time-reversed first intermediate sequence to a third intermediate sequence corresponding to a conjugation of the first set of pseudo-symbols, and mapping the time-reversed second intermediate sequence to a fourth intermediate sequence corresponding to a negation and conjugation of the second set of pseudo-symbols;

generating a fifth bit sequence from the third intermediate sequence and a sixth bit sequence from the fourth intermediate sequence;

creating a first CPM signal and a second CPM signal, wherein the first CPM signal corresponds to a continuous phase modulated first burst, which the continuous phase modulated first burst is based on the third bit sequence and the sixth bit sequence, and wherein the second CPM signal corresponds to a continuous phase modulated second burst, which the continuous phase modulated second burst is based on the fourth bit sequence and the fifth bit sequence; and transmitting the first CPM signal through a first transmit antenna and the second CPM signal through a second transmit antenna.

2. The method of claim 1, wherein the generating the first intermediate sequence and the second intermediate sequence comprises:

generating the first intermediate sequence by applying, to the first bit sequence, a cumulative sum of binary symbols corresponding to the first bit sequence; and generating the second intermediate sequence by applying, to the second bit sequence, a cumulative sum of binary symbols corresponding to the second bit sequence.

3. The method of claim 2, wherein the respective first and second intermediate sequence is an integer sequence $k_m$ comprising m integers, which integer sequence $k_m$ is given by $$k_m = \left(\sum_{n \leq m} 1 - 2a_n\right) \bmod 2H,$$

wherein $a_n$ is the user code bits comprised in the respective third and fourth bit sequence and wherein H is a positive integer.

4. The method of claim 1, wherein the one or more tail bits are data dependent and chosen such that pseudo-symbol sequences generated from one or more of the first, second, third and fourth intermediate sequences end in a predetermined pseudo-symbol given by $$\exp\left(j\frac{1 \cdot \pi}{H}\right),$$

wherein H is a positive integer.

5. The method of claim 1, wherein the mapping comprises:

mapping, by using a map σ(k), the time-reversed first intermediate sequence to the third intermediate sequence corresponding to the conjugation of the first set of pseudo-symbols, wherein the map σ(k) is given by σ(k)=(2H−k)mod2H, and wherein k is an integer between 0 and 2H−1, and H is a positive integer; and mapping, by using a map τ(k), the time-reversed second intermediate sequence to the fourth intermediate sequence corresponding to the negation and conjugation of the second set of pseudo-symbols, wherein the map τ(k) is given by τ(k)=τ(k+H), and wherein k is an integer between 0 and 2H−1, and H is a positive integer.

6. The method of claim 1, wherein the generating the fifth bit sequence and the sixth bit sequence comprises:

generating the fifth bit sequence from the third intermediate sequence by taking differences modulo 2H of consecutive entries of the third intermediate sequence and mapping 1 to 0 and mapping a value equal to 2H−1 to 1; and generating the sixth bit sequence from the fourth intermediate sequence by taking differences modulo 2H of consecutive entries of the fourth intermediate sequence and mapping 1 to 0 and mapping a value equal to 2H−1 to 1, wherein H is a positive integer.

7. A non-transitory computer readable storage medium comprising a computer program comprising instructions which, when executed on at least one processor, causes the at least one processor to carry out the method according to claim 1.

8. A transmitter for transmitting continuous phase modulation (CPM) signals to a receiver, wherein the transmitter and the receiver are comprised in a wireless communications network, and wherein the transmitter is configured to:

divide a sequence of user code bits into a first bit sequence and a second bit sequence, wherein the first and second bit sequences are of equal length;

obtain a third bit sequence by appending one or more tail bits to the first bit sequence, and a fourth bit sequence by appending one or more tail bits to the second bit sequence;

generate a first intermediate sequence based on the third bit sequence, and a second intermediate sequence based on the fourth bit sequence, wherein the first intermediate sequence corresponds to a first set of pseudo-symbols and wherein the second intermediate sequence corresponds to a second set of pseudo-symbols;

time reverse the first intermediate sequence and the second intermediate sequence;

map the time-reversed first intermediate sequence to a third intermediate sequence corresponding to a conjugation of the first set of pseudo-symbols, and map the time-reversed second intermediate sequence to a fourth intermediate sequence corresponding to a negation and conjugation of the second set of pseudo-symbols;

generate a fifth bit sequence from the third intermediate sequence and a sixth bit sequence from the fourth intermediate sequence;

create a first CPM signal and a second CPM signal, wherein the first CPM signal corresponds to a continuous phase modulated first burst, which the continuous phase modulated first burst is based on the third bit sequence and the sixth bit sequence, and wherein the second CPM signal corresponds to a continuous phase modulated second burst, which the continuous phase modulated second burst is based on the fourth bit sequence and the fifth bit sequence; and transmit the first CPM signal through a first transmit antenna and the second CPM signal through a second transmit antenna.

9. The transmitter of claim 8, wherein the transmitter, in generating, the first intermediate sequence and the second intermediate sequence, is further configured to:

generate the first intermediate sequence by applying, to the first bit sequence, a cumulative sum of binary symbols corresponding to the first bit sequence; and generate the second intermediate sequence by applying, to the second bit sequence, a cumulative sum of binary symbols corresponding to the second bit sequence.

10. The transmitter of claim 9, wherein the respective first and second intermediate sequence is an integer sequence $k_m$ comprising m integers, which integer sequence $k_m$ is given by $$k_m = \left(\sum_{n \leq m} 1 - 2a_n\right) \bmod 2H,$$

wherein $a_n$ is the user code bits comprised in the respective first and second bit sequence and wherein H is a positive integer.

11. The transmitter of claim 8, wherein the one or more tail bits are data dependent and chosen such that pseudo-symbol sequences generated from one or more of the first, second, third and fourth intermediate sequences end in a predetermined pseudo-symbol given by $$\exp\left(j\frac{1\cdot\pi}{H}\right),$$

wherein H is a positive integer.

12. The transmitter of claim 8, wherein the transmitter, in mapping, is further configured to:
  map, by using of a map σ(k), the time-reversed first intermediate sequence to the third intermediate sequence corresponding to the conjugation of the first set of pseudo-symbols, wherein the map σ(k) is given by σ(k)=(2H−k)mod2H, and wherein k is an integer between 0 and 2H−1, and H is a positive integer; and
  map, by using of a map t(k), the time-reversed second intermediate sequence to the fourth intermediate sequence corresponding to the negation and conjugation of the second set of pseudo-symbols, wherein the map τ(k) is given by τ(k)=τ(k+H), and wherein k is an integer between 0 and 2H−1, and H is a positive integer.

13. The transmitter of claim 8, wherein the transmitter, in generating, is further configured to:
  generate the fifth bit sequence from the third intermediate sequence by taking differences modulo 2H of consecutive entries of the third intermediate sequence and mapping 1 to 0 and mapping a value equal to 2H−1 to 1; and
  generate the sixth bit sequence from the fourth intermediate sequence by taking differences modulo 2H of consecutive entries of the fourth intermediate sequence and mapping 1 to 0 and mapping a value equal to 2H−1 to 1, wherein H is a positive integer.

* * * * *